(12) United States Patent
Cha et al.

(10) Patent No.: US 8,881,257 B2
(45) Date of Patent: Nov. 4, 2014

(54) METHOD AND APPARATUS FOR TRUSTED FEDERATED IDENTITY MANAGEMENT AND DATA ACCESS AUTHORIZATION

(75) Inventors: Inhyok Cha, Yardley, PA (US); Andreas Schmidt, Frankfurt am Main (DE); Andreas Leicher, Frankfurt (DE); Yogendra C. Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 56 days.

(21) Appl. No.: 13/011,558

(22) Filed: Jan. 21, 2011

(65) Prior Publication Data

US 2012/0023568 A1 Jan. 26, 2012

Related U.S. Application Data

(60) Provisional application No. 61/297,446, filed on Jan. 22, 2010.

(51) Int. Cl.
*H04W 12/06* (2009.01)

(52) U.S. Cl.
USPC .................................. 726/10; 726/3

(58) Field of Classification Search
CPC ............ H04L 63/0807; H04L 63/0823; H04L 9/3294; H04L 63/0815; G06F 21/33
USPC .................................. 726/1, 3, 10
See application file for complete search history.

(56) References Cited

U.S. PATENT DOCUMENTS

| | | | |
|---|---|---|---|
| 5,590,199 A * | 12/1996 | Krajewski et al. ............ | 713/159 |
| 7,314,169 B1 * | 1/2008 | Jasper et al. .................. | 235/382 |
| 8,266,681 B2 * | 9/2012 | Deshpande et al. ........... | 726/5 |
| 8,275,985 B1 | 9/2012 | Narayanan et al. | |
| 8,307,414 B2 * | 11/2012 | Zerfos et al. .................... | 726/10 |
| 8,312,521 B2 | 11/2012 | Isobe et al. | |
| 8,533,803 B2 | 9/2013 | Cha et al. | |
| 8,627,410 B2 * | 1/2014 | Hughes et al. .................... | 726/3 |

(Continued)

FOREIGN PATENT DOCUMENTS

| | | |
|---|---|---|
| JP | 2003/143136 | 5/2003 |
| JP | 2009-43037 | 2/2009 |

(Continued)

OTHER PUBLICATIONS

Klenk et al., "Preventing Identity Theft with Electronic Identity Cards and the Trusted Platform Module", Proceedings of the Second European Workshop on System Security, Mar. 31, 2009, 44-51.

(Continued)

*Primary Examiner* — Farid Homayounmehr
*Assistant Examiner* — Sanchit Sarker
(74) *Attorney, Agent, or Firm* — Baker & Hostetler LLP

(57) ABSTRACT

Systems, methods, and instrumentalities are disclosed that may provide for integration of trusted OpenID (TOpenID) with OpenID. The authentication may be accomplished, in part, via communications between a trusted ticket server on a UE and a network application function. The UE may retrieve platform validation data (e.g., from a trusted platform module on the UE). The UE may receive a platform verification in response to the platform validation data. The platform verification may indicate that the network application function has verified the platform validation data and the user. The platform verification may indicate that the platform validation data matches a previously generated reference value.

16 Claims, 21 Drawing Sheets

(56) References Cited

U.S. PATENT DOCUMENTS

| | | | |
|---|---|---|---|
| 2001/0045451 A1 | 11/2001 | Tan et al. | |
| 2003/0078094 A1* | 4/2003 | Gatto et al. | 463/25 |
| 2005/0105734 A1* | 5/2005 | Buer et al. | 380/270 |
| 2006/0095454 A1* | 5/2006 | Shankar et al. | 707/101 |
| 2006/0101285 A1* | 5/2006 | Chen et al. | 713/193 |
| 2006/0143698 A1* | 6/2006 | Ohara | 726/10 |
| 2006/0155993 A1 | 7/2006 | Busboon | |
| 2006/0251257 A1 | 11/2006 | Haverinen et al. | |
| 2007/0056025 A1 | 3/2007 | Sachdeva et al. | |
| 2007/0180504 A1* | 8/2007 | Hung | 726/5 |
| 2007/0266256 A1* | 11/2007 | Shah et al. | 713/178 |
| 2008/0059804 A1 | 3/2008 | Shah et al. | |
| 2009/0007250 A1* | 1/2009 | Pouzin et al. | 726/10 |
| 2009/0013391 A1 | 1/2009 | Ernst | |
| 2009/0307333 A1* | 12/2009 | Welingkar et al. | 709/219 |
| 2010/0071038 A1* | 3/2010 | Flynn et al. | 726/5 |
| 2010/0217799 A1 | 8/2010 | Heider et al. | |
| 2010/0287369 A1 | 11/2010 | Monden | |
| 2011/0030043 A1 | 2/2011 | Jones et al. | |
| 2011/0060947 A1* | 3/2011 | Song et al. | 714/37 |
| 2011/0067095 A1* | 3/2011 | Leicher et al. | 726/10 |
| 2011/0083169 A1 | 4/2011 | Moeller et al. | |
| 2011/0162042 A1* | 6/2011 | Xiao et al. | 726/3 |
| 2011/0213959 A1 | 9/2011 | Bodi et al. | |
| 2011/0225637 A1* | 9/2011 | Counterman | 726/7 |
| 2011/0252243 A1* | 10/2011 | Brouwer et al. | 713/189 |
| 2011/0283337 A1 | 11/2011 | Schatzmayr | |
| 2011/0289567 A1 | 11/2011 | Bauer-Hermann et al. | |
| 2011/0302627 A1 | 12/2011 | Blom et al. | |
| 2012/0023568 A1* | 1/2012 | Cha et al. | 726/10 |

FOREIGN PATENT DOCUMENTS

| | | |
|---|---|---|
| JP | 2009-49464 | 3/2009 |
| WO | WO 2007/094165 | 8/2007 |
| WO | WO 2007/111234 | 10/2007 |
| WO | WO 2008/024454 A1 | 2/2008 |
| WO | WO 2009/118502 | 10/2009 |

OTHER PUBLICATIONS

Leicher et al., "Implementation of a Trusted Ticket System", IFIP Advances in Information and Communication Technology, Jun. 11, 2009, 1-12.

Pashalidis et al., "Single Sign-On Using Trusted Platforms", 6th International Conference on Information Security, ISC 2003, Dec. 10, 2003, 54-68.

PCT Application No. PCT/US2011/022141 : International Search Report and Written Opinion of the International Searching Authority, Apr. 21, 2011, 10 pages.

PCT Application No. PCT/US2011/024200 : International Search Report and Written Opinion of the International Searching Authority, May 19, 2011, 12 pages.

Peng et al., "Trust of User Using U-Key on Trusted Platform", 8th International Conference on Signal Processing ICSP-2006, Nov. 16-20, 2006, 4 pages.

Urien, "An OpeniD Provider based on SSL Smart Cards", Consumer Communications and Networking Conference (CCNC), 2010 7th IEEE, Jan. 9-12, 2010, 2 pages.

Watanabe et al., "Federated Authentication Mechanism using Cellular Phone—Collaboration with OpenID", 2009 Sixth International Conference on Information Technology: New Generations, Apr. 27-29, 2009, 435-442.

3$^{rd}$ Generation Partnership Project (3GPP) TS 11.14, V8.18.0, "3$^{rd}$ Generation Partnership Project: Technical Specification Group Terminals; Specification of the SIM Application Toolkit for the Subscriber Identity Module—Mobile Equipment (SIM—ME) Interface (Release 1999)", Jun. 2007, 157 pages.

3$^{rd}$ Generation Partnership Project (3GPP), TS 03.19 , V8.5.0, 3$^{rd}$ Generation Partnership Project: Technical Specification Group Terminals; Subscriber Identity Module Application Programming Interface (SIM API) for Java Card™; Stage 2 (Release 1999), Sep. 2009, 24 pages.

3$^{rd}$ Generation Partnership Project (3GPP), TS 03.48, V8.9.0, "3$^{rd}$ Generation Partnership Project; Technical Specification Group Terminals; Security Mechanisms for the SIM Application Toolkit: Stage 2 (Release 1999)", Jun. 2005, 34 pages.

3$^{rd}$ Generation Partnership Project (3GPP), TS 11.11, V8.14.0, "3$^{rd}$ Generation Partnership Project; Technical Specification Group Terminals; Specification of the Subscriber Identity Module—Mobile Equipment (SIM—ME) Interface (Release 1999)", Jun. 2007, 182 pages.

3$^{rd}$ Generation Partnership Project (3GPP), TS 23.048, V5.9.0, "3$^{rd}$ Generation Partnership Project; Technical Specification Group Core Network and Terminals; Security Mechanisms for the (U)SIM Application Toolkit; Stage 2 (Release 5)", Jun. 2005, 36 pages.

3$^{rd}$ Generation Partnership Project (3GPP), TS 31.102, V8.8.0, "3$^{rd}$ Generation Partnership Project; Technical Specification Group Core Network and Terminals; Characteristics of the Universal Subscriber Identity Module (USIM) Application (Release 8)", Dec. 2009, 208 pages.

3$^{rd}$ Generation Partnership Project (3GPP), TS 31.111, V9.0.0, "3$^{rd}$ Generation Partnership Project; Technical Specification Group Core Network and Terminals; Universal Subscriber Identity Module (USIM) Application Toolkit (USAT) (Release 9)", Dec. 2009, 106 pages.

3$^{rd}$ Generation Partnership Project (3GPP), TS 31.130, V9.0.0, "3$^{rd}$ Generation Partnership Project; Technical Specification Group Core Network and Terminals; (U)SIM Application Programming Interface; (U)SIM API for Java™ Card (Release 9)", Dec. 2009, 19 pages.

3$^{rd}$ Generation Partnership Project (3GPP), TS 51.011, V4.15.0, "3$^{rd}$ Generation Partnership Project; Technical Specification Group Core Network and Terminals; Specification of the Subscriber Identity Module—Mobile Equipment (SIM—ME) Interface (Release 4)", Jun. 2005, 170 pages.

European Telecommunications Standards Institute (ETSI), TS 102 221, V5.10.0, "Smart Cards; UICC-Terminal Interface; Physical and Logical Characteristics (Release 5)", Jul. 2007, 125 pages.

European Telecommunications Standards Institute (ETSI), TS 102 241, V6.12.0, "Smart Cards; UICC Application Programming Interface (UICC API) for Java Card™ (Release 6)", Feb. 2007, 31 pages.

Google, "Federated Login for Google Account Users", Google OpenID, http://code.google.com/intl/de-DE/apis/accounts/docs/OpenID.html, Accessed Mar. 14, 2011, 1-11.

Google, "OAuth 1.0 for Web Applications", http://code.google.com/intl/de-DE/apis/accounts/docs/OAuth.html, Accessed Mar. 14, 2011, 1-5.

Google, "OpenID OAuth Extension", http://step2.googlecode.com/svn/spec/openid_oauth_extension/latest/openid_oauth_extension.html, Accessed Mar. 14, 2011, 1-6.

3GPP. "3GPP TS 29.109 V9.1.0", Dec. 2009.

Cahill, Conor P., ed. "Liberty IDP Service Specification", Dec. 2007.

Friese, Ingo et al., ed. "Bridging IMS and Internet Identity", Dec. 2009.

Hirsch, Frederick, et al., ed. "Security and Privacy Considerations for the OASIS Security Assertion Markup Language (SAML) V2.0", 2005.

Jorstad, Ivar et al. "Releasing the potential of OpenID & SIM", 2009.

Leicher, Andreas et al. "Smart OpenID: A Smart Card Based OpenID Protocol", 2012.

Open ID. "OpenID Authentication 2.0- Final", Dec. 2007.

Abe, Tsuyoshi et al. "Implementing Identity Provider on Mobile Phone", 2007.

Alsaleh, Mansour and Carlisle Adams. "Enhancing Consumer Privacy in the Liberty Alliance Identity Federation and Web Services Frameworks", 2006.

Cahill, Conor P. et al. "Liberty 10-WSF Advanced Client Technologies Overview", 2007.

Cantor, Scott et al. "Liberty 10-FF Protocols and Schema Specification", 2005.

Gourmelen, Gael et al. "Liberty 10-WSF Advanced Client Implementation and Deployment guidelines for SIM/UICC Card environment", available at least Jun. 2009.

Hodges, Jeff et al. "Liberty 10-WSF Authentication, Single Sign-On, and Identity Mapping Services Specification", 2007.

(56) References Cited

OTHER PUBLICATIONS

"Disruptive Civil Technologies Six Technologies with Potential Impacts on US Interests out to 2025", National Intelligence Council, Appendix F: The Internet of Things(Background), Apr. 10, 2008, 19 pages.

"Shared Destinies—How the Internet of Things, Social Networks & Creative Collaboration Will Shape Future Market Structure", White Paper, Harbor Research, Inc., San Francisco, California, Jun. 2009, 19 pages.

3GPP TR 33.812 V9.2.0, "3rd Generation Partnership Project; Technical Specification Group Services and System Aspects; Feasibility study on the security aspects of remote provisioning and change of subscription for Machine to Machine (M2M) equipment (Release 9)", Jun. 2010, 1-87.

3GPP TR 33.820 V8.1.0, "3rd Generation Partnership Project; Technical Specification Group Service and System Aspects; Security of H(e)NB", Jun. 2009, 1-78.

3GPP TS 33.320, V9.4.0, "3rd Generation Partnership Project; Technical Specification Group Services and System Aspects; Security of Home Node B (HNB) / Home evolved Node B (HeNB) (Release 9)", Dec. 2010, 1-34.

Arm, "TrustZone™", http://www.arm.com/products/security/trustzone, accessed Dec. 28, 2010, 4 pages.

Azema et al., "M-Shield™ Mobile Security Technology: Making Wireless Secure", Texas Instruments White Paper, copyright 2008, 1-6.

BCC Research, ID Technologies, "Safety and Security", Report code SAS013A, Jun. 2005, 1 page.

Bellare et al., "Keying Hash Functions for Message Authentication", Advances in Cryptology—Crypto '96 Proceedings, Lecture Notes in Computer Science, Jun. 1996, 1109, 1-19.

Bellare, "New Proofs for NMAC and HMAC: Security without Collision-Resistance", Advances in Cryptology—CRYPTO '06, Jun. 2006, 1-31.

Canitrot, "SIMAlliance@SIMposium2009", SIMAlliance, Vienna, Apr. 21-22, 2009, 1-40.

European Telecommunications Standards Institute (ETSI), TS 102 127, V6.13.0, "Smart Cards; Transport Protocol for CAT applications; Stage 2 (Release 6)", Apr. 2009, 1-67.

European Telecommunications Standards Institute (ETSI), TS 102 483, V8.1.0, "Smart Cards; UICC-Terminal interface; Internet Protocol connectivity between UICC and terminal (Release 8)", Apr. 2009, 1-21.

European Telecommunications Standards Institute (ETSI), TS 102 689, V1.1.1, "Machine-to-Machine communications (M2M); M2M service requirements", Aug. 2010, 1-34.

European Telecommunications Standards Institute (ETSI), TS 102 691, V1.1.1, "Machine-to-Machine communications (M2M); Smart metering use cases", May 2010, 1-49.

Google Code, OAuth, Authentication and Authorization for Google APIs, "OAuth for Web Applications", http://code.google.com/intl/de-DE/apis/accounts/docs/0Auth.html, accessed on Dec. 28, 2010, 7 pages.

Google Code, OpenID, Authentication and Authorization for Google APIs, "Federated Login for Google Account Users", http://code.google.com/intl/de-DE/apis/accounts/docs/OpenID.html, accessed on Dec. 28, 2010, 13 pages.

IBM, "IBM PCI Cryptographic Coprocessor: Notice of Withdrawal from Marketing", www-03.ibm.com, accessed on Jan. 17, 2011, 4 pages.

IDC, Inc. (Gantz—Project Director), "The Expanding Digital Universe. A Forecast of Worldwide Information Growth Through 2010", Mar. 2007, 24 pages.

Lamport, "Password authentication with insecure communication", Communications of the ACM, Nov. 1981, 24(11), 770-772.

Lasica, "Identity in the Age of Cloud Computing: The next-generation Internet's impact on business, governance and social-interaction", 17th Annual Aspen Institute Roundtable on Information Technology, Aspen, Colorado, Jul. 29-Aug. 1, 2008, 110 pages.

Leicher et al., "Trusted Computing Enhanced OpenID", International Conference for Internet Technology and Secured Transactions (ICITST), London, England, Nov. 8-11, 2010, 8 pages.

Preneel et al., "MDx-MAC and Building Fast MACs from Hash Functions", Proceedings Crypto '95, Aug. 1995, 14 pages.

Preneel et al., "On the Security of Two MAC Algorithms", Advances in Cryptology—EUROCRYPT '96, Nov. 17, 1995, 1-12.

VeriSign, "Security and Trust: The Backbone of Doing Business over the Internet", 2010, Accessed on Dec. 28, 2010, 8 pages.

Tatsuo Ikeda, et al., "A Proposal of Authentication Scheme for Use-Identification Environment," Computer Security Symposium 2002, pp. 337-342, Information Processing Society of Japan, Oct. 30, 2002.

Takehisa Kato, et al., "The Secure Network for Preventing the Outflow Unknown Packets," Computer Security Symposium 2002, pp. 239-244, Information Processing Society of Japan, Oct. 30, 2002.

Itsuo Ito, et al., "Finger Vein Authentication for Finance," The Hitachi Hyoron, vol. 88, No. 4, pp. 18-23, Hitachi Hyoronsha, Apr. 1, 2006.

Koji Uchida, "Revising Japanese Bankers Association IC Cash Card Standard Specifications to Support Biometrics Authentication," CardWave, vol. 19, No. 9, pp. 44-46, C.media Co., Ltd., Aug. 20, 2006.

Akira Monden, et al., "Remote Authentication Protocol," Proceedings of Multimedia, Distributed, Cooperative, and Mobile (DICOMO2007) Symposium, pp. 1322-1331, Information Processing Society of Japan, Jun. 29, 2007.

Yuko Tamura, et al., "Current State and Problems Concerning Supporting Retail Banking System IC Cards," Financial Research, vol. 26, Extra Issue, No. 1, pp. 101-127, Obun Printing Company, Inc., Aug. 20, 2007.

Jonathan Arnowitz,et al., Software Prototyping—Seeking Better Design—, First Edition, Kozo Keikaku Engineering Inc., Dec. 15, 2009, p. 210.

Japanese patent application No. 2012-552953: English translation of Office Action dated Nov. 12, 2013, 3 pages.

* cited by examiner

METHOD AND APPARATUS FOR TRUSTED FEDERATED IDENTITY MANAGEMENT AND DATA ACCESS AUTHORIZATION

CROSS-REFERENCE TO RELATED APPLICATIONS

This application is based on, and claims priority to, U.S. Provisional Patent Application No. 61/297,446, filed on Jan. 22, 2010, the contents of which are hereby incorporated by reference in its entirety.

BACKGROUND

An elementary use of Trusted Computing (TC) for authentication may be to provide credentials for authentication to a Trusted System (TS) protected by, for example, a hardware trusted platform module (TPM). As a main security feature, this may bind credentials to a specific TS. An application of this authentication in wireless networks may be via an extensible authorization procedure-transport layer security (EAP-TLS). Use of single sign-on (SSO) with TS may present potential security problems.

SUMMARY

Systems, methods, and instrumentalities are disclosed that may provide for integration of trusted OpenID (TOpenID), as disclosed herein, with OpenID.

A user of a wireless device, such as a user equipment (UE) for example, may be authenticated, e.g., in response to an authentication request from a network application function. A trusted ticket server (TTS) on the UE may retrieve platform validation data (e.g., from a trusted platform module on the UE). The platform validation data may include a measure of the trustworthiness of the wireless device. The TTS may send the platform validation data to the network application function. The UE may receive a platform verification indicating that the network application function has verified the platform validation data and the user. The platform verification received from the network application function may indicate that a system state indicated by the platform validation data matches a previously generated reference value.

The UE may receive a ticket that includes the platform verification. The ticket may be is capable of being reused to perform a subsequent authorization without revalidation of the wireless device. The ticket may include a timestamp, lifetime limit, etc.

The UE may receive a ticket reference from a network entity. The ticket reference may be capable of being used to obtain the ticket from a network application function. The platform verification included in the ticket may be capable of being reused to perform a subsequent authorization without revalidation of the wireless device.

BRIEF DESCRIPTION OF THE DRAWINGS

A more detailed understanding may be had from the following description, given by way of example in conjunction with the accompanying drawings wherein:

FIG. 8 illustrates an exemplary TVT log on;

FIG. 9 illustrates another exemplary TVT log on;

FIG. 10 illustrates another exemplary TVT log on;

FIG. 11 provides exemplary visual indications related to TVT log on;

DETAILED DESCRIPTION OF ILLUSTRATIVE EMBODIMENTS

FIGS. 1-21 may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom. Further, the figures may illustrate call flows, which are meant to be exemplary. It is to be understood that other embodiments may be used. Further, the order of the flows may be varied where appropriate. In addition, flows may be omitted if not needed and additional flows may be added.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" may include but is not limited to a Node-B, a site controller, an access point (AP), or any other type of interfacing device capable of operating in a wireless environment.

The disclosure herein may use the OpenID protocol as an example authentication and access system and is applicable to other authentication and access systems. For purposes of explanation, the various embodiments are described in a Third Generation Partnership (3GPP) context, but the various embodiments may be implemented in any wireless communication technology. Some example types of wireless communication technologies may include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), Long Term Evolution (LTE), or any future technology.

Figure 1:
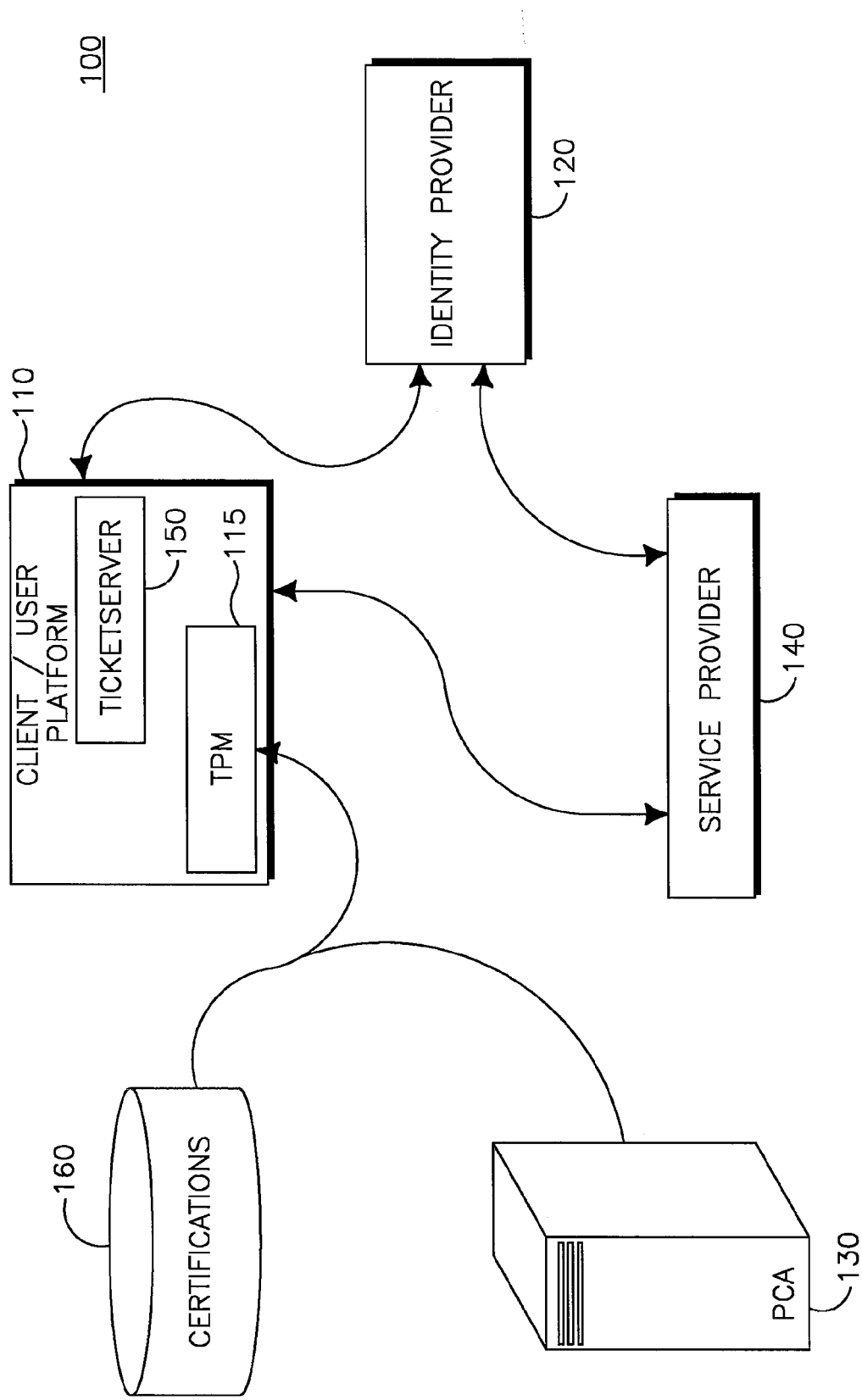
FIG. 1 illustrates an exemplary authentication and access system.

FIG. 1 illustrates an exemplary authentication and access system 100 including, but not limited to, a client/user platform 110, an identity provider 120, a privacy certification authority (PCA) 130 and a service provider 140. The client/user platform 110, the identity provider 120, and the service provider 140 may be in communication with each other through any combination of wireless and wired communication systems. Client/user platform 110 may be in communication with the PCA 130, which may be communication with a storage media 160 that may store, for example, certifications.

Client/user platform 110 may be a WTRU, base station, computing platform, or any device that may need authentication. The client/user platform 110 may include, but is not limited to, a trusted platform module (TPM) 115 that provides remote attestation and sealing and binding capabilities for data for the client/user platform 110. The TPM 115 may be a microcontroller that stores keys, passwords, digital certificates and is able to generate cryptographic keys. It may be affixed to the motherboard, or integrated into the system's chipset, and may be used in any computing device that may require these functions. TPM 115 may secure its information, e.g., from external software attack, physical tampering, eavesdropping, etc. Access to data and secrets in the TPM 115 or client/user platform 110 may be denied if the measurement values taken for components during a boot sequence are not as expected versus reference measurement which may make applications and capabilities such as secure email, secure web access, and local protection of data more secure. Although a trusted platform module is discussed herein, other trust centers may be used, such as for example, a mobile trusted module.

TPM 115 may use an endorsement key (EK), e.g., a 2048-bit Rivest-Shamir-Adelman (RSA) public and private key pair, which is created randomly on the chip at manufacture time and cannot be changed. The private key may be restricted to the chip, while the public key is used for attestation and for encryption of sensitive data sent to the chip. The public parts of the EK may be generally known by the PCA 130 via the EK certificate for purposes of attestation. When the TPM 115 needs to authenticate itself to a verifier, such as for example an identity provider, it may generate a second RSA key pair, called an attestation identity key (AIK), send the AIK public key to the PCA 130, and authenticate this public key against the corresponding EK. If the PCA 130 finds this EK in its list, it may issue a certificate on the TPM's 115 AIK. TPM 115 may then provide this certificate to the identity provider 120 and authenticate itself.

AIKs (at least the identity embodied in the AIK) may represent at least one part of the ticket described herein. The usage of the AIKs in a ticket may be restricted by the TPM 115. An indirect approach, termed the CertifyKey operation, may be used wherein a signing key is generated by the TPM 115 and certified by signing it with an AIK. This key may be referred to as a certified signing key (CSK). The CSK and AIK, together with the PCA attesting to the validity of the AIK, may constitute a portion of the ticket described herein.

The client/user platform 110 may include a trusted ticket server, TTS 150, that generates the credentials, or tickets, for service access. When referring to a ticketserver in relation to trusted OpenID herein, such reference may be to a trusted ticket server. TTS 150 may authenticate the user. TTS 150 may validate the client/user platform 110, and itself, toward the identity provider 120, e.g., using trusted computing methods of platform attestation. Since security information and operations may be concentrated in the TTS 150, it may need to be trusted to handle AIK certificates and CSKs properly and not proliferate them to other platforms; protect tickets and credentials; protect security operations on credentials by user authorization; provide secure options to be integrated into common web-browsers and be accessed by them; and collect, process, and send platform validation data.

The user may need to choose a PCA 130 to certify the AIKs created in the TPM 115. The PCA 130 may hold identity related information, and, contractual measures may need to be taken to ensure non-disclosure of this identity related information. After certifying an AIK at the PCA 130, the user may choose an identity provider 120 to host the claimed identity. The claimed identity may be represented by a universal resource identifier (URI) chosen by the user. In order to register such a claimed identity, the user may be required to provide a valid AIK certificate to the identity provider 120.

The identity provider 120 may be presented with a minimal amount of identity related information. The user may decide which information hosted at the PCA 130 may be revealed to the identity provider 120. Contractual measures may need to be taken to ensure coordination between the parties, otherwise, a rogue PCA may be capable of certifying identities belonging to a different user. As the PCA 130 may not reveal the user's real identity to the identity provider 120, the identity provider 120 may not be able to link different requests to a single identity.

The ability to resolve a claimed identity to a real identity may be limited to PCA 130. This may be done by keeping a secured database that maps (unique) EK certificates to AIKs. The EK certificates used during AIK certifications may allow for an identification of the TPM 115 and hence the client/user platform 110 (e.g., assuming that one user has physical access to the platform 110, this resolves to the user).

The service provider 140 may enable identity provider login for the site. For example, the service provider 140 may have an OpenID login logo on the front page. The identity provider 120 used by the user/client may be required to be in the list of known and accepted identity providers of the service provider 140.

Federated identity or single-sign-on (SSO) schemes may provide user friendly methods to enable a user to log onto several secure sites using a single credential. Although several forms of implementation of federated identity schemes may be possible, the disclosure herein provides an outline of trusted concepts using OpenID as an example. Other methods, for example, single sign-on (SSO) access to applications and internet based services using trusted computing techniques and binding authentication between user, device and network may be applied.

OpenID may allow for different authentication methods to authenticate a user. To claim an identity at the OpenID provider, several methods may be used. One method may be the use of logon forms, where the user provides a password.

This logon may be replaced with a TPM based logon process. The user may register an identity that is tightly bound to his/her specific platform, for example a TPM. If the user decides to login using this identity, the OpenID provider may challenge him to provide the correct credentials. In this case, the credentials may include a TPM generated ticket, for example a credential chain. This may allow the user to login without the need for a password at the OpenID provider. A local password at the user's computer may be used to protect the identity from local attacks.

The logon may be combined with an integrity verification of a specific platform. Using a TPM signed statement on the system configuration values, the OpenID provider may compare the reported system state to previously generated reference values. This procedure may allow trustworthy clients to login and claim an identity. This combined authentication and attestation may allow for a fine grained access control by binding the authentication data to a specific platform and to a predefined system state, which may be considered trustworthy. This may allow enablement of new use cases for OpenID that may require an enhanced security and safety of the system, and therefore may not allow modifications leading to a non-trustworthy system. Although the embodiments discussed are based on a TPM, other trusted system variants may also possible, e.g., a mobile to mobile (MTM) or trusted environment.

The trusted Kerberos (TKerberos) concept may rely on two servers, such as an Authentication Server (AS) and/or a Ticket Granting Server (TGS) for example. Each of these servers may issue tickets. Each ticket may include two parts. For example, one part may be encrypted for the next target server and thus may not be decrypted by the client. This part may include a session key that may be used by the next communication step. The session key may be encrypted for the client in the second part of the ticket. If the client can decrypt the second part, the client may obtain the session key to request the next ticket.

TKerberos may be performed in stages as follows, for example. For example, the ticket granting ticket (TGT) may be requested and/or received from the AS and stored for future use. The session key may be decrypted to encrypt the authentication data for the service ticket (ST) request. The TGT may be sent together with the encrypted authenticator to the TGS. The ST may be received from the TGS. The session key may be decrypted to encrypt the authentication data for the service request. The ST may be sent with the encrypted authenticator to the service provider.

The TKerberos protocol may use TC. The design may have targets, such as to enhance the security by providing means to bind the tickets closely to the user's Ticket Server (TS) via the TPM, and/or to protect the privacy of the user accessing a service for example.

The AS may perform the role of the PCA and/or the TGT may act as an AIK certificate. The ticket acquisition process may include two parts in TKerberos to allow a platform to cache tickets in advance and individualize them for service access.

Figure 1A:
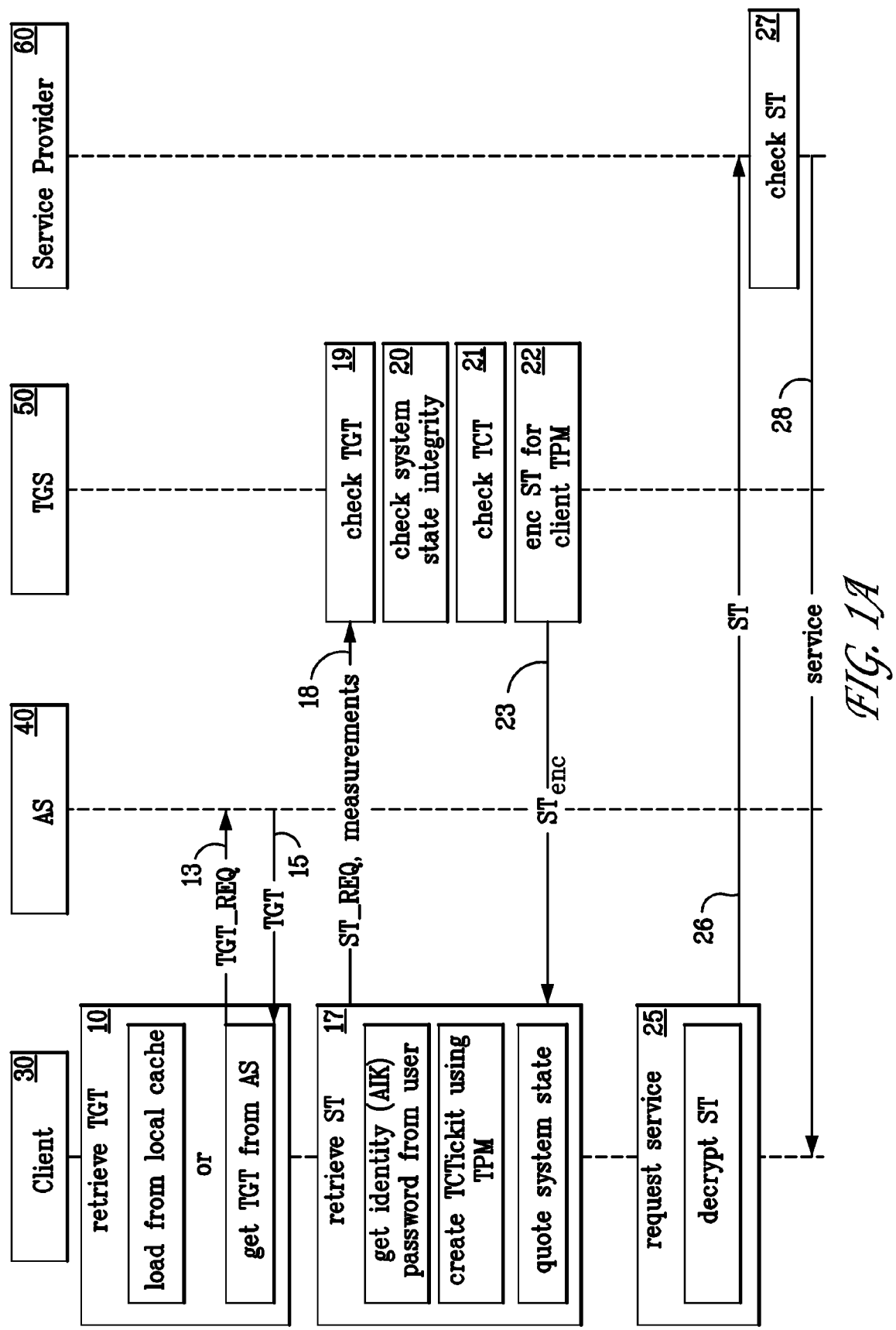
FIG. 1A illustrates an exemplary call flow related to trusted Kerberos.

Included in the security on the server side, there may be attestation of the user's system. When the user wants to acquire an ST to access a service, the user may be challenged by the TGS to remotely attest system conformity. As a result, clients in a certified system state may be able to access the service. FIG. 1A illustrates an exemplary call flow related to trusted Kerberos. The TGT may be augmented by a TCTicket that has the claimed identity of the TGT and service request, and which may be signed by the TPM.

As illustrated in FIG. 1A, a client 30, AS 40, TGS 50, and Service Provider 60 are configured for communications between each other. Client 30 may retrieve TGT at 10. For example, client 30 may load from local cache and/or get TGT from AS 40. Client 30 may make a TGT request 13 to AS 40. The client's real identity information may be protected as it may be encrypted using the AS 40 public key. AS 40 may return the TGT response at 15 to client 30. The TGT response from the AS may be encrypted using the public EK of the TPM.

Client 30 may retrieve ST at 17. At 17, client 30 may get identity (AIK) password from a user, create TCTicket using TPM, and/or quote a system state. The client 30 may use an ST request at 18 to retrieve the ST. When the client 30 uses a TGT to request an ST from the TGS 50, the communication may be encrypted by the session key from the TGT. The TGS 50 may check the TGT at 19, check system state integrity at 20, check TCT at 21, and/or encrypt ST for client TPM at 22. The TGT may be decrypted by the TGS 50, revealing the session key and/or allowing the TGS to decrypt the data provided by the client. The response may be cryptographically bound to the TPM by encrypting the session key with a one-time key bound to the Certified Signing Key (CSK) from the TCTicket and secured by the TPM.

The user in possession of the TPM and the credentials for the key usage in the TPM may decrypt the ST and thus use it to access a service. For example, as illustrated in FIG. 1A, the client 30 may request a service at 25. The client 30 may decrypt the ST, if encrypted, and provide the ST to Service Provider 60, at 26. The Service Provider 60 may check the ST at 27 and, if the ST is valid, provide the requested service at 28.

The trusted ticket concept may include the attestation of the client in the ticket acquisition process. The attestation toward the TGS may be described as adding to security. This may provide for changes in the form of specific applications. Such changes may apply to the Trusted OpenId concept. For example, one such change may be to individualize the ST issued by TGS and/or the state of the client via attestation and/or potentially remediation. That is, the TGS may be enabled to enforce policies that may allow clients in a specific state to access specific services. Another such example may be to allow the TGS to validate the service itself before the client accesses it, such as by challenging the server for an attestation of its state for example. Thus, the TGS, or the OpenID provider in the case of Trusted OpenID for example, may act as a mediator that ensures that clients and servers in mutually accepted and/or trustworthy states enter into a communication relation. If there are many clients, this may contribute to too much load on services, which might apply in some cases. The load may be mitigated, such as by validating services infrequently for example. There may be parallel problems in machine-to-machine (M2M) communication in 3GPP. For example, validating the M2ME semi-autonomously without changing existing network infrastructure may present problems. The concepts of trusted identity management (IdM) presented may be the building blocks to enable operators' conventional authentication authorization accounting (AAA) infrastructures for this purpose. Trusted versions of remote authentification dial-in user service (RADIUS) or the like may be applied.

Systems and methods for trusted open ID (TOpenId) may be provided. Trusted OpenID entities may include: 1) the user e.g., accessing a service; 2) the OpenID provider; 3) a PCA to certify AIKs from the user's TPM; and/or 4) a service provider using OpenID authentication.

Figure 2:
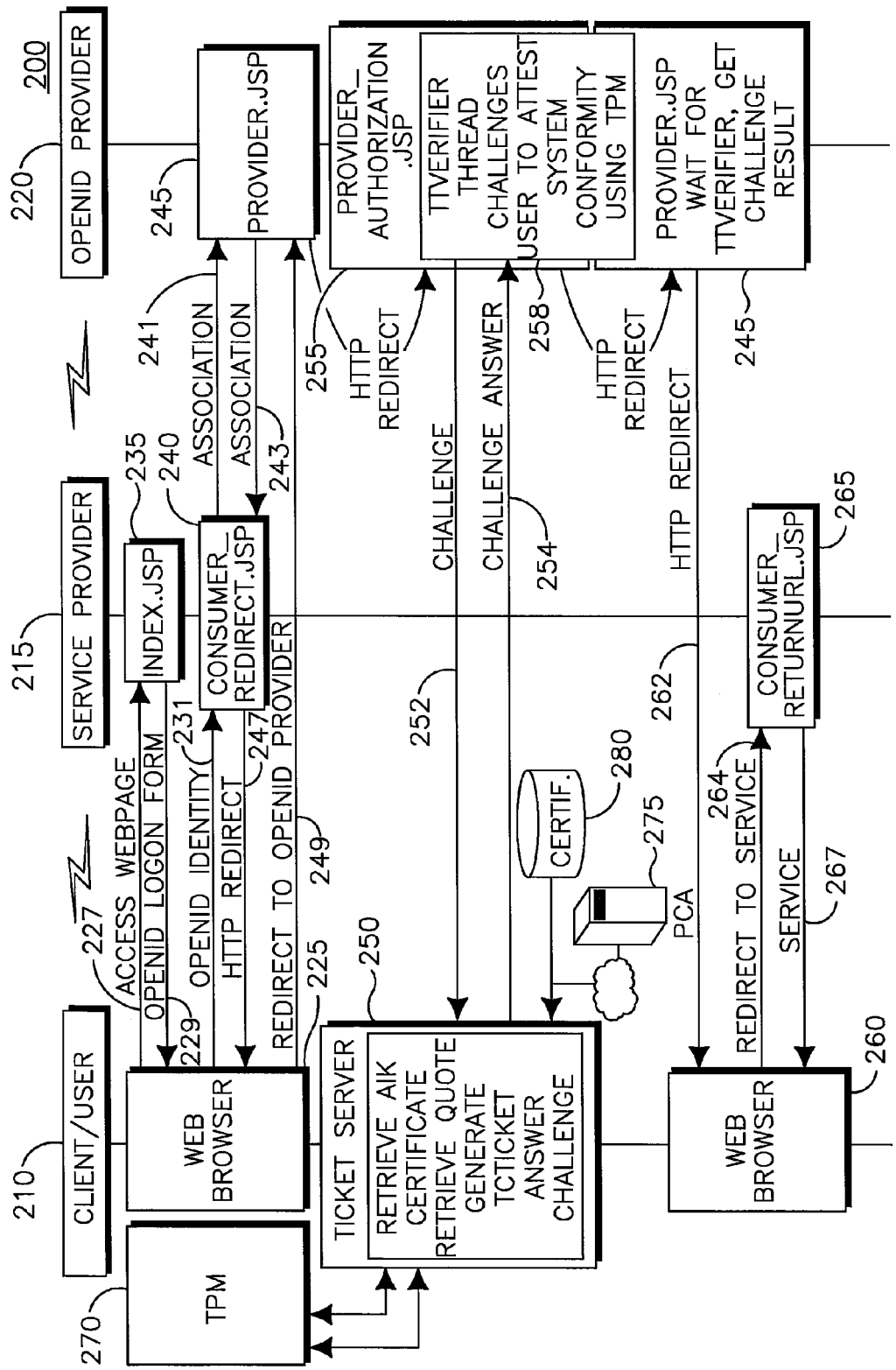
FIG. 2 illustrates an exemplary call flow relating to trusted OpenID.

FIG. 2 illustrates an exemplary call flow 200 relating to trusted Open ID. Call flow 200 may be a protocol that may be performed when accessing a service using Trusted OpenID for example. As discussed herein, a client/user or user platform 210, service provider 215, and identity provider 220 (shown as an example OpenID Provider) are configured for communications between each other. When using a Trusted OpenID, the client/user platform 210 may make an initial connection with the service provider 215. The client/user platform 210 may use its web browser 225 to access a service provider webpage (identified as index.jsp 235) via an access webpage message 227. If the client/user 210 wants to login using, for example, the user's OpenID URI, the service provider 215 may connect to the given URI and thus retrieve the address of the OpenID provider 220 hosting the claimed identity. The index.jsp page 235 at the service provider 215 may request the URI via OpenID logon form message 229 and retrieve the address of the OpenID provider 220 hosting the claimed identity via OpenID identity message 231.

The service provider 215 then may attempt to form an association with the OpenID provider 220. In accordance with the OpenID protocol, the service provider 215 may associate with the OpenID provider 220 via association message 241. This may include a secure exchange of the request, the claimed identity, and/or a return URL, via association message 243, to which the client/user platform 210 may be sent a redirect message 247 by the service provider 215 and/or OpenID provider 220 if authentication is successful. This is performed at service provider 215, such as by consumer-redirect.jsp 240, and/or at OpenID provider 220, such as by provider.jsp 245. After association, the client/user platform 210 may be redirected to provider.jsp webpage 245 of the OpenID provider 220, such as via redirect to OpenID provider message 249. The redirection address may be retrieved from the user supplied identifier, which may ensure that the client/user platform 210 that is redirected to the OP page is the same entity who has supplied the identifier. The redirect may be preformed via HTTP redirect which may directly redirect the browser to the OP login page.

The client/user platform 210 may then be authenticated. The OpenID provider 220 may switch from the provider.jsp webpage 245 to the provider-authorization.jsp webpage 255 to authenticate the client/user platform 210. The client/user platform 210 may be provided with the provider-authorization.jsp webpage 255, requesting authentication. The user may initiate the request by clicking a link on provider-authorization.jsp webpage 255. This starts a new background thread, such as TTverifier 258, which challenges the TicketServer 250 via challenge message 252. The provider-authorization.jsp webpage 255 redirects the client/user platform 210 back to the provider.jsp webpage 245. The provider.jsp webpage 245 waits for the TTverifier 258 to finish and evaluate the result of the challenge provided in challenge answer message 254. As described herein, a trusted ticket server (TTS), such as ticketserver 250 may use TPM functionality to generate the appropriate answer including a ticket and/or may interact with TPM 270, PCA 275, and/or storage media 280 which may hold, for example, certifications. Other parts of the protocol may use OpenID protocol. The OpenID provider 220 and/or the client/user platform 210 may use the TPM-generated TCTickets as authentication token may be modified.

Assuming a successful authentication, the client/user platform 210 may be redirected to the service provider. The provider.jsp webpage 245 may send a redirection message 262 to the client/user platform 210. Redirection message 262 may redirect the client/user platform 210 to the consumer_returnurl.jsp page 265 at the service provider 215 via redirect to service message 264. The consumer_returnurl.jsp page 265 may check that the redirect comes from the associated OpenID provider 220 and grants access to the client/user platform 210 via service message 267.

Figure 3A:
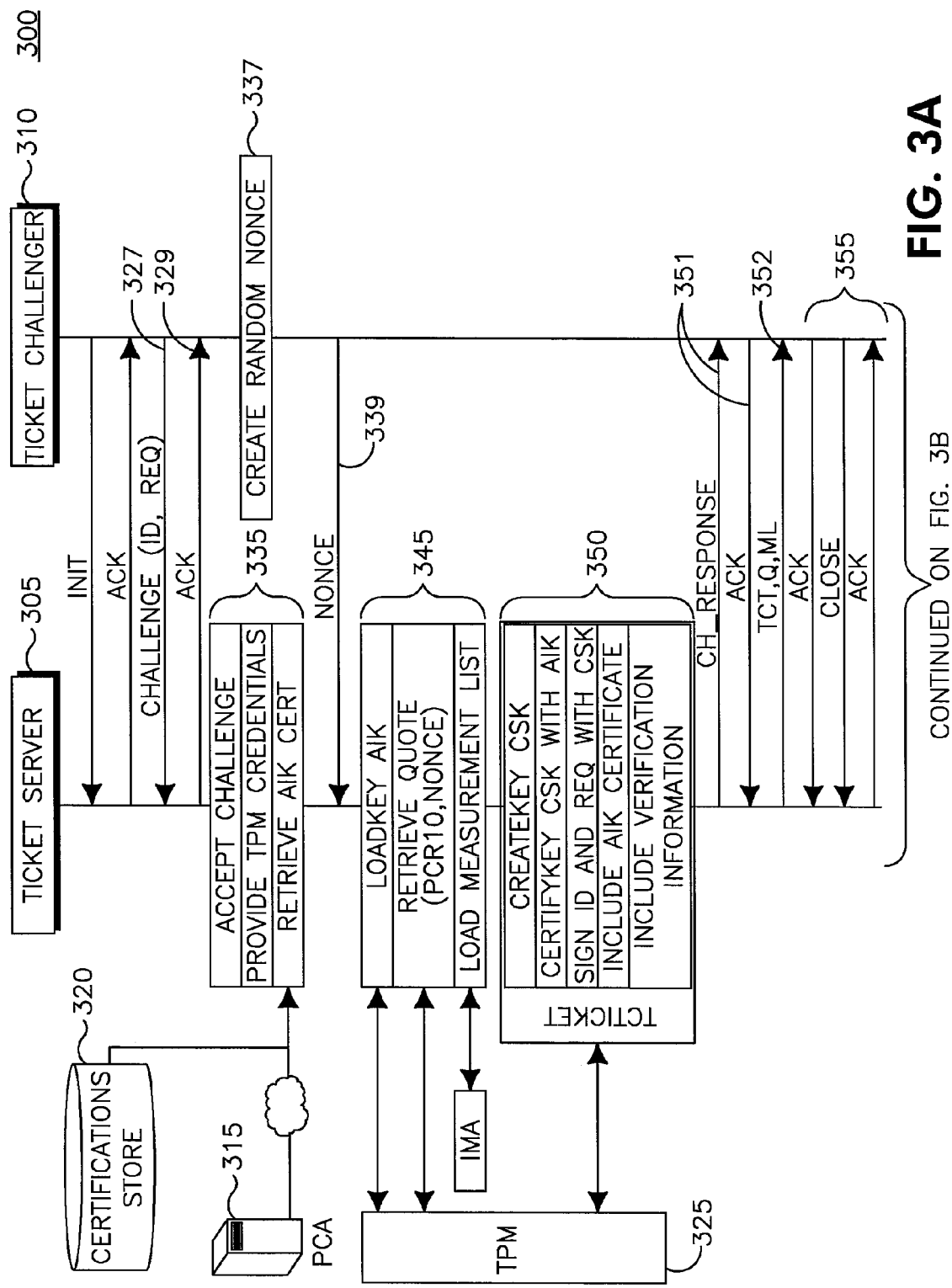
FIGS. 3A and 3B illustrate an exemplary call flow relating to a trusted ticket server challenge-response.
Figure 3B:
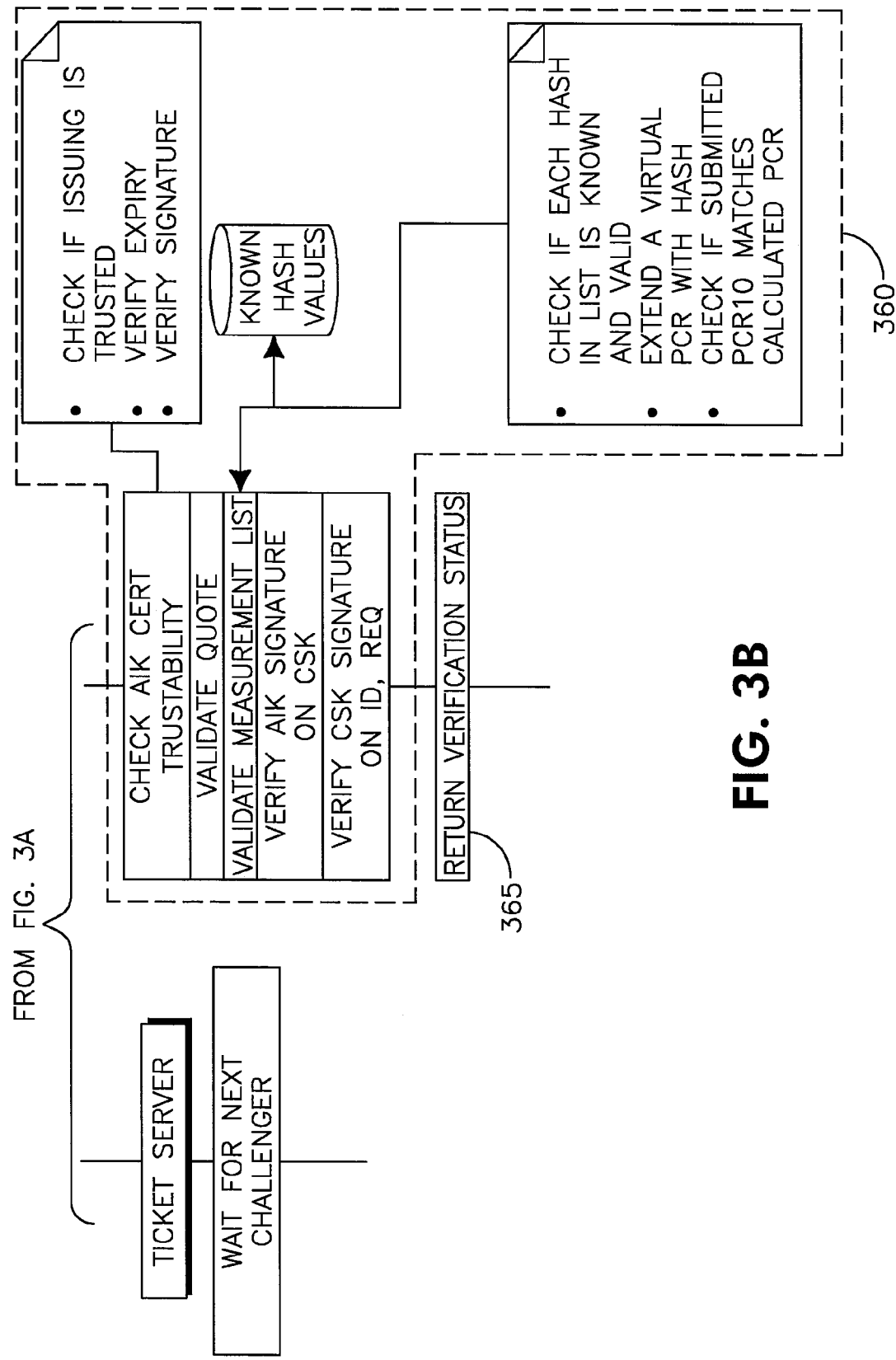

FIGS. 3A and 3B illustrate an exemplary call flow 300 relating to a trusted ticket server challenge-response between a ticketserver 305 and a ticket challenger 310. Storage media 320 and TPM 325 may be used. The ticketserver 305 may run as a service application on the client. The ticketserver 305 may listen on a predefined port and wait for challenges. Upon receipt of a challenge message 327 (including the identity the user wanted to use in, for example, OpenID and the service request that was issued at the service provider), the user may be required to allow the challenge using an acknowledge message 329. The user may have the option to deny the challenge. If denied, then the OpenID authentication may fail.

If the challenge is accepted, the user may be prompted to enter the password for the AIK corresponding to the given identity and to authenticate TPM 325 usage by entering the storage root key (SRK) password at ticketserver 305. The SRK may then be included in the TPM command which is able to access TPM secured keys. The ticketserver 305 then may attempt to retrieve a previously acquired certificate, such as an AIK certificate, for this identity from the certificate storage media 320, collectively shown as 335, which may be used for system state information retrieval 345 and/or TCTicket generation 350 as discussed herein. The certificate may come from a previous AIK certification with a PCA, such as PCA 315, and may be retrieved from local certificate storage on the system, such as certification storage media 320. If the certificate is not available in the local storage (or the certificate for the AIK in the local storage has expired or became invalid), another certificate for the identity represented by the AIK may be requested from the PCA 315. If a certificate cannot be found in the certificate storage media 320, the user may choose PCA 315 to connect to in order to undergo an AIK certification process and/or obtain a certificate for the AIK. The user may supply the correct owner password of the TPM 325. This may prevent creation of rogue identities by persons other than the owner of the TPM 325. The user input may be forwarded by ticketserver 305 to TPM 325 where the password is evaluated.

In response to accepting the challenge, the ticket challenger 310 may create a random nonce 337. The ticketserver 305 may receive the random nonce 337 from the Ticket Challenger 310 via nonce message 339. An AIK-signed quote Q of the platform configuration registers (PCR) values describing the system configuration, including the nonce, may be retrieved from the TPM 325, making a statement about the system's state, collectively shown as 345.

The ticketserver 305 may then create a TCTicket, collectively shown as 350. The TCTicket creation 350 may involve the creation of a key by the TPM (such as an RSA key pair for example) that may be used to sign the request and/or the identity. As described herein, this key may be certified with the AIK using the CertifyKey operation. That is, the TPM may use the function CertifyKey for this created key pair to generate a certification statement and a binding, where a binding refers to building a chain of trust to the AIK and/or to the AIK certificate from the PCA. When the created key is certified successfully, it may be referred to as a certified signing key (CSK). There may be multiple CSKs, and/or multiple AIKs in a TPM (or secured by the TPM in the secure storage protected by the TPM).

The needed information to verify the TCTicket 350 may be included in the TCTicket 350, so that a receiving party (such as the ticket challenger 310 in FIGS. 3A and 3B for example) may easily verify the TCTicket 350. Together with the plaintext measurement log ML and/or the quote Q, the response including the TCTicket 350 may be sent back to the ticket challenger 310, such as via TCT, Q, ML message 352. CH-RESPONSE and ACK messages (collectively 351) may be protocol signaling messages to inform the receiving party (such as the ticket challenger 310 for example) that the next message may comprise the TCTicket 350, the quote, and/or the ML.

FIGS. 3A and 3B may represent the inner operations of the TTVerifier Thread 258 in FIG. 2. Since the OpenID provider may handle multiple requests at the same time, it may be that each requesting client gets a new, fresh, and/or unique challenge to prevent replay attacks.

Upon acknowledgement of the TCTicket 350 via messages 355, the ticket challenger 310 may have the following data: the AIK signed quote from the TPM 325, including the nonce 337 as anti-replay protection; the plain-text measurement file; the TCTicket 350 including the signed identity string, signed request string, public key portion of the CSK, AIK signature on the public key portion of the CSK, and/or AIK certificate issued by the PCA 315. To authenticate the client, the ticket challenger 310 may perform the following, collectively shown as 360, in no particular order: 1) validate (timestamp) of AIK certificate (the validity information may also be captured as a value of a use-counter for example); 2) verify PCA signature on AIK certificate; 3) verify AIK signature on CSK public key hash in TCTicket 350; 4) verify signature on service request and identity in TCTicket 350; 5) validate the entries in the measurement list; and/or 6) verify that the actual (quoted) (PCR) values correspond to the measurement list ML.). In the validation of the AIK certificate, what may be verified is whether the local client's own protected counter value has not yet reached a "maximum" number that may be indicated in the AIK certificate. The local client's protected counter value may indicate the number of installations of certificates and/or software of the openID client for example.

If an item in this verification process fails, the client may not be authenticated. A specific credential chain may be built by ticketserver 305 and PCA 315, such as AIK certificate—certified CSK—signed request for example. A verification status message 365 may be sent to the user. This is also shown, for example, by redirection message 262 in FIG. 2. In this instance, message 262 may redirect a user's browser to either the service provider's return-url or the user may be authenticated at the service provider. If an above verification fails (certificate failures and/or system integrity failures), the redirect may send the user to an authentication failed page at the OpenID provider. Customized result pages may be created at the OpenID provider in the case of a failed authentication. The customized results pages may show the cause of the failure. This may include showing the user which modules or software failed the integrity checks and/or could be leveraged to a system which proposes to the user next steps to bring his system back into a trustworthy state.

In view of the disclosure herein, the PCA 275 may be invoked once for every partial identity to be used with a specific service provider 215. In an initial registration, the client/user platform 210 may associate its platform identity with a pseudonymous, partial identity. The PCA 275 may provide a certificate for this pseudonymous identity and/or store the association of the pseudonym to the platform identity. This data may be privacy sensitive and thus may have to be protected. The positioning of the PCA 275 may allow for additional options as compared with current ticket systems. The trust model and method disclosed herein may allow for placement of the PCA 275 in places other than at the identity provider 220 and at the selection of the user. This may be less privacy-friendly, since the user may have to trust a PCA selected by the identity provider (IdP).

The plain-text measurement file may be replaced by other types of files that may have information about the measurements performed by the local client device, e.g., measurement values that are encrypted (such as using a key that is bound to the platform for example) for confidentiality protections; and/or values that summarize the individual measurement files.

An example may be a number of individual measurement files that indicate the integrity of a group of components, rather than of individual components for example. Such components may, for example, belong to a group that collectively may embody a particular functionality and/or property of the local client platform.

Depending on the used authentication protocol between the ticketserver 305 and the ticket challenger 310 (such as OpenID IdP protocol for example), it may be possible to reduce the protocol to a challenge response protocol. The challenge response protocol may include 1) the Ticket Challenger 310 may send the challenge (id,req) and/or the nonce to the ticketserver 305, and/or 2) the ticketserver 305 may respond with the TCT, the quote Q and/or the measurement list ML. Such a protocol may allow for an easier integration of the ticket challenger 310, such as at the OP, and the ticketserver 305, such as at the client/user machine, communication in other protocols. For example, such an integration may be performed using an HTTP protocol, which for example may use a simple challenge/response scheme.

User authentication may take place using OpenID in the challenge response shown in FIGS. 3A and 3B. A user may enter a user password. The user password may have been previously registered with the OpenID, so that the same password, if included in the challenge response, would indicate that the user is the same individual who registered it in the first instance. The user password may indicate some kind of other evidence, such as data derived out of a pre-shared secret for example.

In TOpenID, both user authentication and device trust attestation may be achieved as described herein. User authentication may be achieved because, the user may already have pre-registered with the OpenID provider, the certificates for the AIK and/or the CSK for the user device and/or the TPM that is hard-bound to the user device for example. In the step of challenge response, the user may send data that may be signed with the private key of those AIKs and/or the CSK. Therefore, the OpenID provider, upon verification of the public portion of these keys, and/or upon verification that the user is using the same AIK and/or the same CSK that had been pre-registered, may know that the user who used the device to send the challenge response is the same user who had been pre-registered with it. For example, the user device may have the same, hard-bound TPM on it.

Device trust attestation may be achieved. For example, device trust attestation may be achieved because the OpenID provider may verify if the TPM_Quotes of the PCRs, the measurement logs, and/or a part of the ticket (such as user ID or request for example) are signed using the now verified AIK CSK. Device trust attestation may also be achieved because the OpenID provider may verify whether the TPM_Quotes of the PCRs, the measurement logs, and/or the part of the ticket actually produce the expected comparison results. If both match, then the OpenID provider may verify that the device that the user used to send the OpenID request is in fact trustworthy. According to one example, if the verification of the user and the request is achieved, but the comparison of the PCR values and the measurement logs fail, then the OpenID provider may know that the trust-related data sent from the same device that was pre-registered before indicating that the device may be compromised and is in a different configuration state than is expected.

The TOpenID may not violate the OpenID specifications and/or TOpenID may be integrated in OpenID without changes to the OpenID specification. Several authentication options for OpenID identities may be possible and implemented. The protocol flow may be separated into a standardized flow. The protocol flow may describe the interaction of the relying parties (RPs) and the IdP, which may take place through indirect communication. For example, the interaction of the RPs and the IdP may take place by redirecting the user's browser to different web pages and/or transporting the necessary data in the HTTP fields of the messages.

Figure 4:
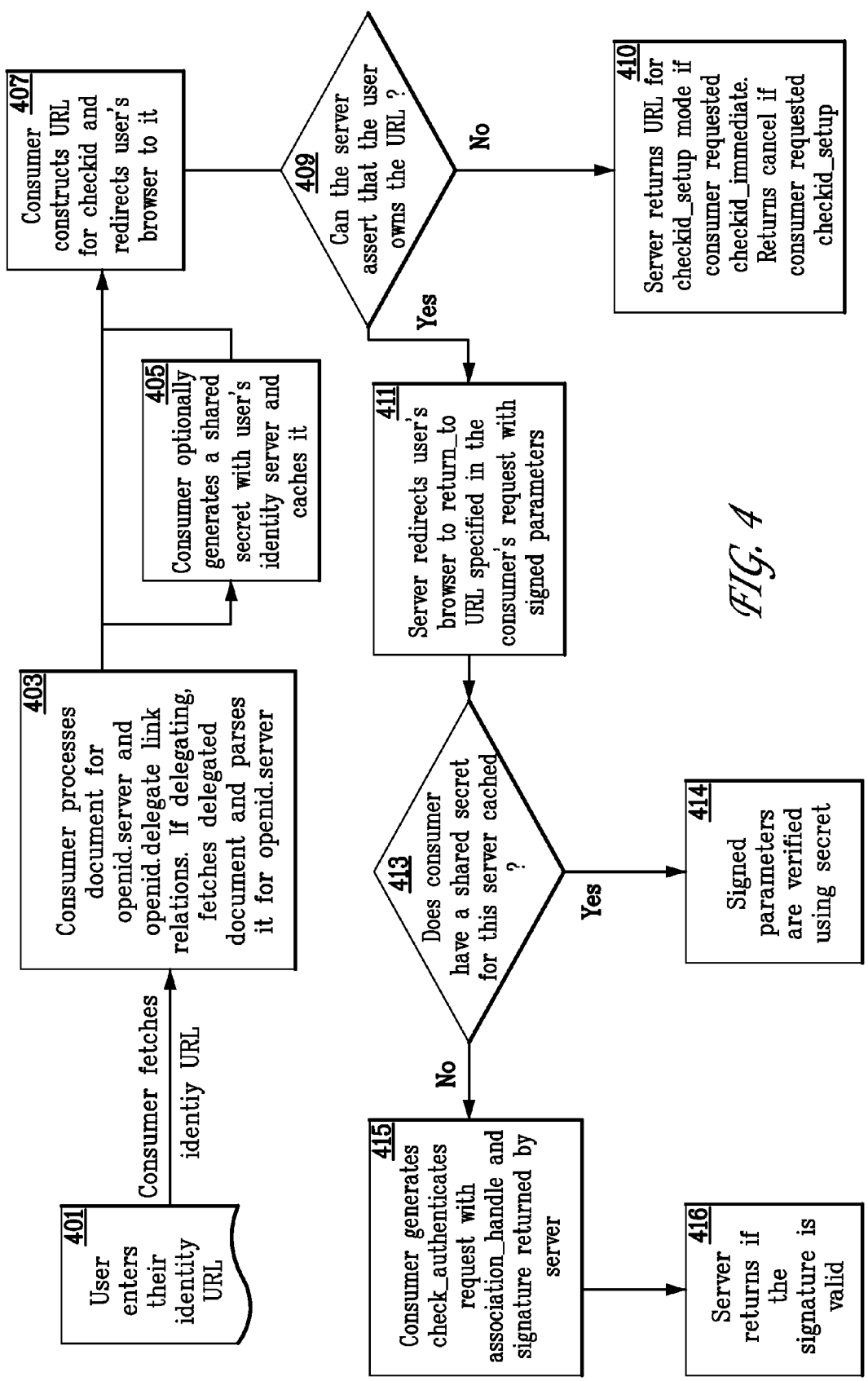
FIG. 4 illustrates an exemplary method relating to trusted OpenID.

FIG. 4 illustrates an exemplary method relating to trusted OpenID. At 401, 403, 405, 407, 410, 411, 413, 414, 415, and 416 an example of the interworking of client's browser, OpenID IdP, and/or RP may be shown. At 409 user authentication takes place, but may be intentionally unspecified. OpenID may not specify the method an identity server may use to verify that the user owns their URL. In some cases, this verification may be performed via cookies. The server may prompt the user if the user wishes to verify the user's identity to the consumer.

As illustrated in FIG. 4, the protocol flow may include a user entering their identity URL at 401. The consumer may fetch the identity URL. At 403, the consumer may process a document for opened.server and opened.delegate link relations. If delegating, fetches delegated document and parses it for oenid.server. At 405, the consumer may generate a shared secret with user's identity server and cache it. The consumer may construct URL for checked and redirect the user's browser to it at 407. At 409, it may be determined whether the server can assert that the user owns the URL. If the server cannot assert that the user owns the URL, then, at 410, the server returns the URL for checked_setup mode if the consumer requested checked_immediate. If the consumer requested checked_setup, then the server may return cancel at 410. If the server can assert that the user owns the URL at 409, then the server may redirect the user's browser to return_to URL specified in the consumer's request with signed parameters at 411. At 413, it may be determined whether the consumer has a shared secret cached for the server. If the consumer does have a shared secret cached, then signed parameters may be verified using the secret at 414. If the consumer does not have a shared secret cached at 413, then at 415 the consumer may generate a check-authentication request with association_handle and a signature returned by the server. At 416, the server may return if the signature is valid.

TOpenID may include platform validation data and/or integrity checking by the IdP in the authentication step. The authentication in TOpenID may be bound to a specific TPM (or a single platform for example) since the OpenID identifier may be registered using a TPMbound AIK. The security properties of the TPM and/or the AIK certification process may guarantee that the identifier may not be used on another platform. The integrity validation by the IdP may ensure that the right platform (or if specified a trusted subsystem, including the Trusted Ticket Server) is running in the right configuration.

The above method may be applied to the TOpenID protocol flows as shown in FIG. 2. The OpenID identity provider (IdP) and/or the user's system may include capabilities to perform the authentication steps using the TPM and its integrity validation protocols. These capabilites may be implemented as software modules and/or libraries on the client and/or the server. For example, these capabilities may be implemented at the client/user platform 210 and/or the OpenID Provider 220, such as atTTverifier 258, challenge message 252, challenge answer message 259, TPM 270, PCA 275, and/or storage media 280. The open concept of OpenID may lead to a large variety of different OpenID IdP implementations. Hence, OpenID IdPs may develop concepts to differentiate amongst themselves. One function that OpenID IDPs may use to differentiate themselves may be the assertion of enhanced security features for example. Such assertions may assure users that their (OpenID) identity is protected, such as if it is HW-bound for example. Users may be assured that such IdPs may enable RPs to rely on the information received from them. For example, enabling banks or other security-demanding applications to use OpenID with a whitelist of security-aware and certified OpenID IdPs.

One method for implementing TOpenID may use a second, non-HTTP based protocol to perform the platform validation. For example, using the second protocol a challenge message may be sent from the OpenID provider 220 to the client/user platform 210 and the response may be sent back to the OpenID provider 220. This may be performed via a background process which may return control to the main authentication process of the OpenID provider 220. The main authentication process may have started with a redirect from client/user platform 210 to OpenID provider 220 as shown in the FIG. 2. An HTTP redirect may then be performed from the OpenID provider 220 to client/user platform 210, as shown in FIG. 2

Different protocols may be used to transfer data, depending on the capabilities of the server and/or the user's device.

The entity which produces the credentials, or tickets, for service access may be incorporated in the client. This may be performed without compromising on the security of TKerberos by the trusted functional entity in the client, such as ticketserver 250 as illustrated in FIG. 2 for example. The ticketserver may validate the client, and itself, toward the OpenID provider. Since security information and operations may be concentrated in the ticketserver component, it may be trusted to handle AIK certificates and/or CSKs properly. The ticketserver may be trusted to: not proliferate AIK certificates and/or CSKs to other platforms, protect tickets and credentials, protect security operation credentials by user authorization, provide secure options to be integrated into common web-browsers and be accessed by them, collect, process and send platform validation data, and/or provide access control based on the validity of the nonce to identify replay attacks.

A specific credential chain, as described herein, may be built by the ticketserver and the PCA. The credential chain in TOpenID may be an AIK certificate—certified CSK—signed request.

Implementations for placing the PCA in a TKerberos system may include the following. Including the PCA in the OpenID provider may reduce complexity. That may be a seamless replacement of the registration with an OpenID provider via a web form. In TOpenID, the user may 1) select an arbitrary external PCA whose AIK certificates may be accepted by the TOpenID provider, and/or 2) use PCA functionality provided directly or indirectly by the TOpenID provider.

Due to its security architecture, TOpenID may mitigate specific threats for OpenID based systems. In TKerberos, the AIK certificate may not be visible on the client but encrypted in the TGT, and decryptable by the TGS. The AIK certificate may be known to the client and may not have hidden information that may threaten privacy, for example. The OpenID implementations may present an OpenID provider login form to the user. The user may enter his credentials and the OpenID provider may issue a cookie to the client. This cookie may then be used for each subsequent OpenID enabled service access. This may lead to possibilities of several attacks on the OpenID protocol, for example: 1) direct attacks on the user credentials used to login to their OpenID provider (phishing with a fake OpenID provider page may expose a large amount of user credentials, allowing for identity theft), or 2) attacks involving the re-use, copying, and/or theft of the cookie from the client's computer after authentication, which may lead to identity theft. Attacks may be mitigated by the use of trusted OpenID. As user passwords may be local and/or provided to the local trusted ticketserver, credential phishing may be defeated. Pseudonymous identities may be bound to the platform. That is, they may not be copied to another device.

There may be no cookies stored on the client's platform. This may prevent the threat of local re-use, such as when a computer is shared by multiple persons for example. In one example, if a user A logs into his OpenID account, and forgets to sign out, user B may try to use the stored cookie to impersonate user A. Such re-use may be prevented by integrating the trusted OpenID authentication seamlessly into the web browser. Whenever a user wants to access a service using trusted OpenID, the OpenID provider may create a new challenge for the ticketserver. The user may see a prompt from his trusted ticketserver application, such as a prompt asking the user for the local AIK password for example, which may be needed to answer the challenge. The ticketserver may not store this AIK authentication secret. If another user B, at the same platform, wants to access the service, the ticketserver may again be challenged by the OpenID provider and/or user B may have to provide the local AIK password of user A (which is not known to user B). This may require the use of a one-time cookie, which may not be stored on the client's platform.

The issued cookie may be encrypted in a way such that the target platform and/or the user may decrypt it and use it as authentication token. The OpenID provider may encrypt the cookie using the public CSK and/or send it to the ticketserver on the client side. Using the TPM, the cookie may be decrypted when needed. The decryption may require the user to authenticate for the CSK usage, such as with the (local) CSK secret for example. The ticketserver may ensure that the cookie is stored encrypted and is decrypted if required. Another implementation for the storage and/or use of the encrypted cookie may be to use a command TPM-Seal to store the cookie in a way that binds it to the integrity of the platform when the sealing operation took place. The next time the previously sealed cookie value is retrieved, the integrity of the platform may be verified to be the same as its value when the sealing operation took place. In this example, when the integrity of the platform matches its previous value, the sealed cookie value may be retrieved.

Trusted OpenID may be extended to a Trusted Google API. Combining OpenID and OAuth may rely on the OpenID authentication process such that further user interaction may not be required other than for example the traditional 'login' at the OpenID provider.

Instead of having the user's TPM sign the OpenID challenge, the TPM may sign the combined OpenID/OAuth challenge as presented by the OpenID provider through the web application's request. The user identification and authorization, as well as the acceptance of access to the data, may be signed securely by the TPM. As in the Trusted OpenID context, security for the user may be improved by 1) binding the login and authorization to the hardware TPM, and/or 2) including an optional platform integrity verification by the OpenID/OAuth provider to prevent stealing of sensitive data by malicious software running on the client. The integrity verification may increase the level of security for the web application. Access to the service may be limited to clients in a proven integrity verified state. This may allow for establishment of new web services for security and privacy applications. The process may provide non-repudiation, e.g., the OAuth access token may be signed by a TPM, which may be uniquely identified. This may facilitate charging processes which may be implemented by the provider of the web application. The signature may allow the web application provider to prove that the user requested and accessed the service.

The TPM based user authentication may allow the platform identity to link to the OpenID identity. The OpenID provider may be required to keep a database of registered identities for a given platform. The OpenID provider may distinguish the legitimate user from an attacker by the given platform credentials. When a login attempt from another platform is detected, the OpenID provider may: 1) refuse authentication, and/or 2) notify the legitimate owner of the identity when he logs in next time.

A possible integration of TOpenID with the OpenID/GBA authentication scheme may be to equip the NAF/IdP with the capabilities of the TOpenID IdP to verify platform integrity values. The GBA authorization header from the NAF/IdP may include the challenge (e.g., id, req, nonce) from the TOpenID protocol in a serialized form. Upon receipt the ME/UE may then de-serialize the challenge and multiplex it to the trusted ticketserver and the GBA Key derivation function which may be used to calculate the authorization digest. The return values of both, for example a signed quote and ML from the trusted ticketserver and the digest value from the GBA process, may then be returned to the NAF/IdP in an HTTP response message.

Authentication and trust evaluation may be combined. Such a combination may bind the use of a specific UICC (e.g., as GBA client) to a single platform. The NAF may authorize the OpenID identifier if the platform is in an integrity proven state, if the platform may be authenticated (e.g., by the AIK), and if the user may be authenticated (e.g., by possession of the UICC/GBA). Such a protocol may allow locking the user to use his OpenID identifier with a single platform in a single configuration with a single UICC.

Figure 5:
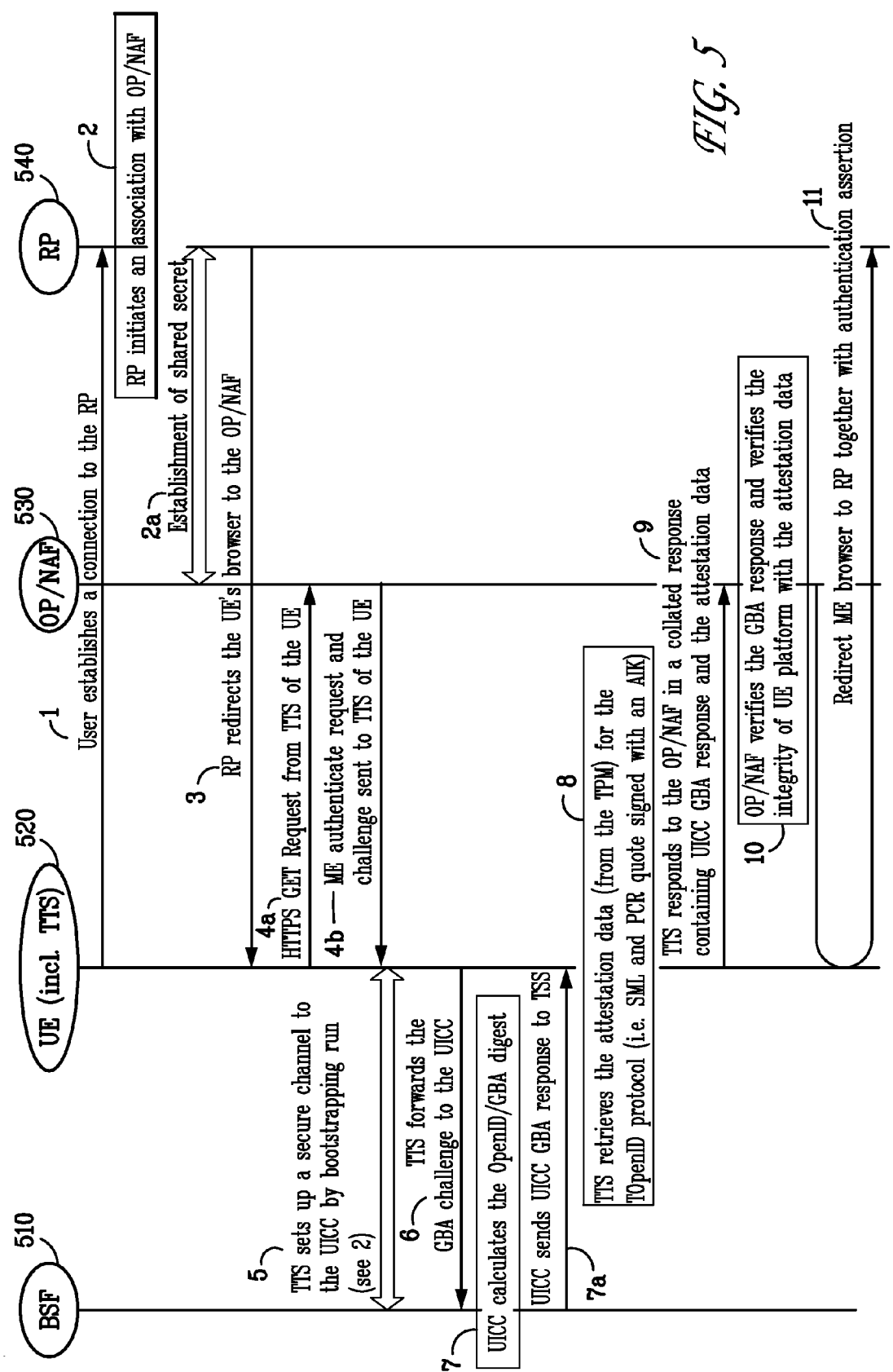
FIG. 5 illustrates an exemplary call flow diagram relating to binding a UICC and WTRU.
Figure 6:
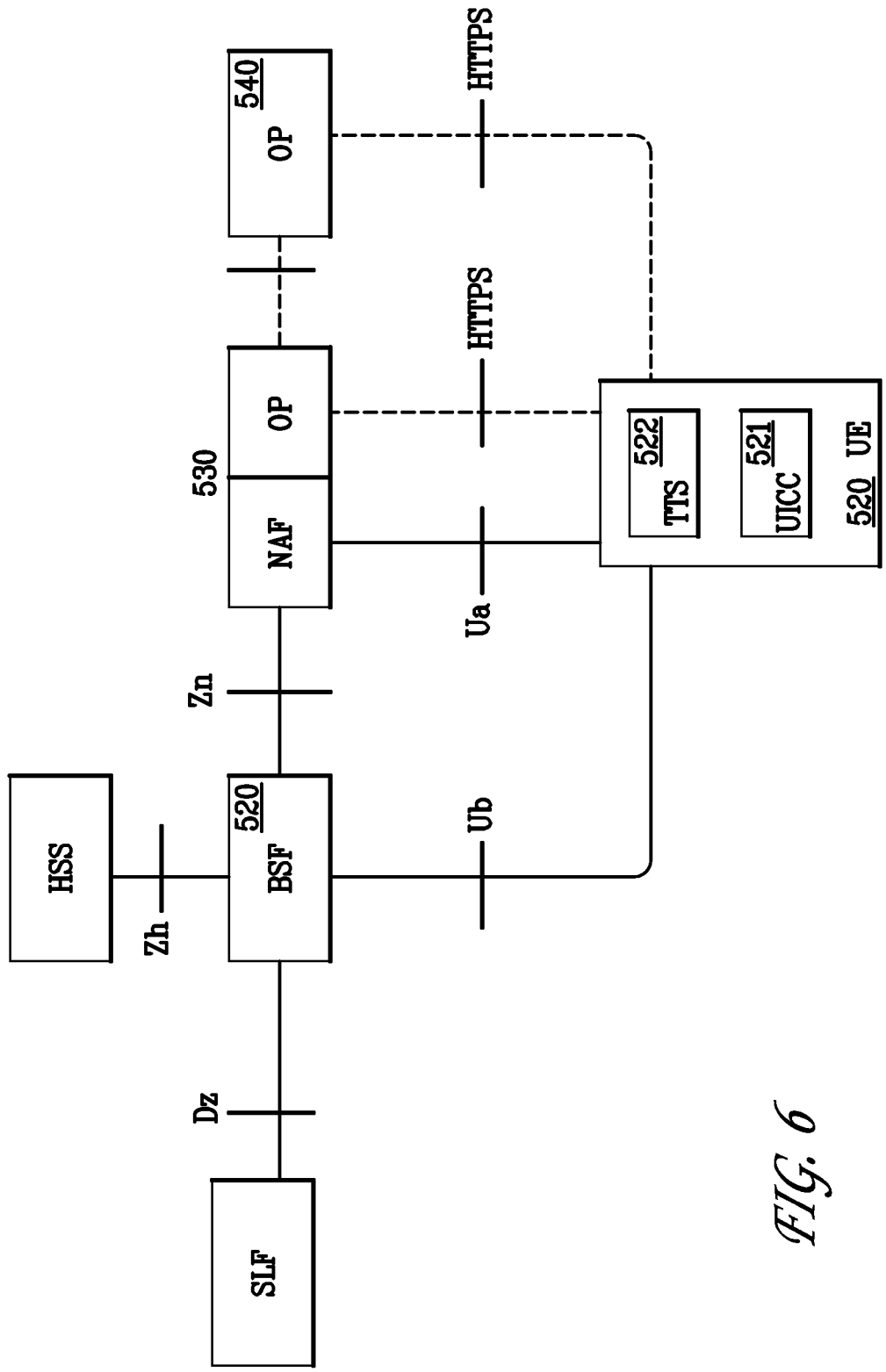
FIG. 6 illustrates an exemplary relationship between components.

FIGS. 5 and 6 are example diagrams for binding a UICC (e.g., associated with a user) and WTRU for OpenID usage. FIG. 5 illustrates an exemplary call flow diagram. FIG. 6 illustrates an exemplary relationship between components. Implementations may assure secure communication with untrusted WTRU elements, e.g., a browser. Referring to FIG. 5, exemplary protocol steps may include one or more of the following: 1) the user may establish a connection to the RP; 2) the RP may initiate an association with the OP/NAF; 3) the RP may redirect the WTRU's browser to the OP/NAF; 4) the communication between the WTRU and OP/NAF may be via the TTS, which may be responsible for authentication (e.g., the TTS may receive the TOpenID challenge together with a GBA challenge) 5) the TTS may establish a secure channel to the UICC; 6) the TTS may forward the GBA challenge to the UICC; 7) the UICC may calculate the digest as in the OpenID/GBA protocol; 7a) the UICC may send a GBA response to the TSS (e.g., with the OpenID/GBA digest) 8) the TTS may retrieve platform validation data/attestation data for the TOpenID protocol, where the platform validation data/attestation data may include a measure of the trustworthiness of the WTRU (e.g., the SML and a PCR quote signed with an AIK), 9) the TTS may respond to the OP/NAF in a collated response comprising the UICC GBA response and the platform validation data/attestation data; 10) the OP/NAF may verify the GBA response and verify the integrity with the platform validation data/attestation data (e.g., verifying that the SML PCR quote matches a previously generated reference value that was previously received by the OP/NAF, which may indicate that a current system state of the WTRU matches a previous state); and 11) the OP/NAF may issue a positive assertion via the WTRU's browser to the RP (e.g., as part of a redirect operation of the ME'S browser to the RP). That is, the NAF may send a platform verification that indicates that it has verified the platform validation data and/or the user. The platform verification may be communicated directly or indirectly (e.g., the platform verification may comprise the WTRU/user being granted access to a relying party (RP)).

The TTS may not necessarily have to establish a secure channel with the UICC. It may be possible to perform two independent sessions, one GBA session between the UICC and the OP/NAF and an attestation session between the TTS and the OP/NAF. The OP/NAF may issue a positive assertion if both protocols succeed. In such a parallel session scenario, it may be necessary for the OP to link both sessions, at least internally, to bind the attestation result to the authentication result of the GBA protocol.

Validation tasks may require a large amount of resources on the network and device to perform. A device which is validated may re-use the validation information for subsequent authentication procedures or interactions with network components, e.g., without having to undergo a new validation procedure. For example, validation information, which may have been generated from an earlier validation session with the network, may be reused. The trusted ticket server may provide a validation ticket (or certificate) as follows. Following a successful validation of the device to the network, the OP/NAF entity inside the MNO's network may issue a ticket, which may be communicated to the device for re-delivery to other network entities upon demand or which may be referenced so the network entities may indirectly obtain the ticket from the OP/NAF entity. The OP/NAF entity may include information with the ticket so that the ticket includes an indication of the ticket/device trustworthiness. For example, the OP/NAF entity may provide a timestamp, an origination timestamp, a lifetime limit for the ticket, an end date for the ticket, a usage parameter limit, etc. Time information may enable network components to ascertain the trustworthy state of a device and when the assessment was carried out. Entities receiving the ticket may consider the information satisfactory to conduct secure transactions with the device or may force a re-validation depending upon the specific application's need for trust in the device.

Such a ticket may be used for platform validation and management. The ticket may be integrity protected and/or confidentiality protected so that it is bound to the OP/NAF entity and the device and so that it may not be altered by entities other than the device or OP/NAF to which the data is bound. The trusted environment (TrE) in the device may securely store the ticket and use it in subsequent interactions with the network without having to perform re-validation. The ticket may be distributed by the device to provide validation status data to other network components. The device may circulate a reference to the ticket from which other network entities may consult the OP/NAF entity to obtain the validation information.

For the combined TOpenID/GBA case, the position of the trust evaluator, e.g., the entity which receives the measurements from the TTS and may be able to compare them to reference metrics to derive a statement on the validation or trustworthiness of the platform based on this assessment, may vary.

Figure 7:
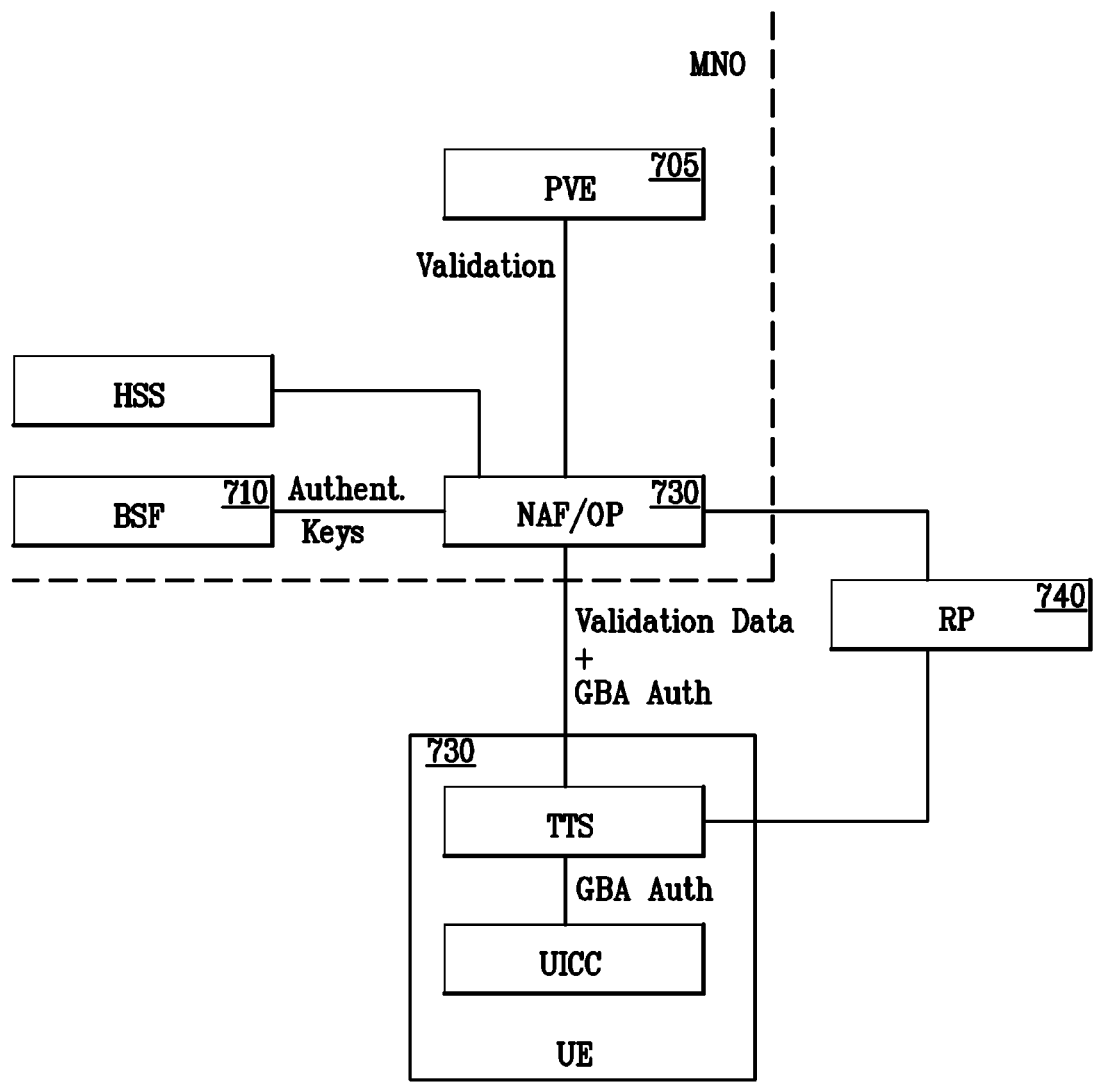
FIG. 7 illustrates an example of a PVE as a trust evaluator.

FIG. 7 illustrates an example of a platform validation entity (PVE) as a trust evaluator in the TOpenID/GBA case. FIG. 7 includes platform validation entity (PVE 705), BSF 710, UE 720, OP/NAF 730, and RP 740. Instead of integrating the trust validation process in the OP/NAF entity inside the MNO's network, it may be possible to reuse existing network entities that may already be in possession of reference integrity metrics for the trust assessment. Such an example may be referred to as a platform validation entity, such as PVE 705. PVE 705 may be equipped with reference metrics and may be able to compare received validation data to reference metrics and issue a statement on the trustworthiness of the device. In such a scenario, OP/NAF 730 may forward the validation data in the internal network to PVE 705, which in turn may perform the trust validation.

Trust evaluation may be implemented by a trusted third party (TTP). If an MNO internal entity is unavailable to perform validation of received validation data, the NAF/OP may forward the validation data to an external trusted third party over a secure channel. The TTP then may perform the verification and validation and issue a statement on the trustworthiness of the platform back to the OP/NAF.

After successful authentication and verification of the user's platform, the service provider (SP) may send a signed java applet to the WTRU, which may be installed in a trusted environment (TrE) of the WTRU. The TrE may verify the applet integrity, for example via a signature and/or certificate from the SP or RIM certificate provided by IdP or trusted third party (TTP), prior to installing the java applet in a trusted environment and answer a SP challenge for a secure UI. The TrE may load the applet using a secure UI, indicating to the user that the current application may run in a secure environment. This scheme may be protected from fake SPs, for example the SP may be required to authenticate and prove integrity to IdP. This scheme may also be protected from fake TrEs, for example by the IdP verifying TrE integrity and functionality and issuing a ticket if the check is successful.

An isolated/sandboxed web-browsers may be implemented. In contrast to typical browser solutions, this may be aimed at publishers of web-applications such as online-banking, webmail, video streaming etc., for example, and define a specific manifest for their web-application. This digitally signed manifest may comprise a list of permitted web-sites for the web-app to connect to and a browser the web-app should run in. A virtualized entity of this browser such as a URL to a vm image may be defined in the manifest, and may be implemented to isolate the web application from other web-applications and/or the host operating system ($0s$). Each sandboxed web-application may be rendered by employing graphical borders to present trust states, for example. The concept may be implemented using XEN virtualization The WTRU may perform both a platform attestation using TTS, and then application attestation using the TrE (an environment that runs small trusted sandboxed Java applets) on the device. Note that the TTS and the TrE may both be built on top of, and use the functions of, some common trusted hardware component in the WTRU device.

A secure user interface (secure UI) may be required TOpenID and OpenID to increase security. The basic TOpenID protocol may derive its increased security from the Trusted Ticket Server, which may collect device integrity information. The device integrity information may be evaluated by the OpenID IdP. If software running on the device is in a well-known and trusted state, the authentication may succeed. The authentication may be bound to a TPM-stored and PCA-certified AIK. The AIK may be used to sign the PCR quote used for attestation. Authentication may be limited to implementation with the given platform (e.g., device with the TPM) in a given state.

Attestation and integrity checking may be limited to certain components, e.g., components necessary for secure operation of TOpenID. In such an approach, the device may be separated into a trusted/secure part and an untrusted part.

The trusted ticket server may run as a trusted and integrity checked application inside the trusted world. Access to hardware, including the drivers, may be protected by a service instance in the trusted world. Access to the device's capabilities may be limited through this service instance which may provide the necessary APIs to the untrusted world. These APIs may provide access to the device capabilities and be equipped with a security policy framework which may allow access restrictions to be enforced.

If integrity checking and verification by the IdP is limited to parts of the device, the user may need to confirm the use of the OpenID ID with the Trusted Ticket Server and that this input may not be intercepted or replayed in the manner of a man in the middle or man in the device/man in the browser attack. The trusted part may provide a trusted User Interface (UI) which may protect the input and indicate to the user that he may be using the device in a secure mode. An example indicator may be a light emitting diode (LED) which may be lit if the device (processor) is running in trusted mode. The LED may be controlled by the trusted or secure element. Whenever the user is to enter the credentials for the use of the OpenID ticket, the Secure UI may indicate that the device is operating in secure mode. A device such as an LED may be in some mappable address space connected to the external processor interface, protected via a secure hardware interface, where access may be limited to the secure and trusted environment.

Parts of a protected frame buffer of the graphics device may be used. Other drivers may not be allowed to write or read from this part of device memory. The secure/trusted driver may then use this frame buffer memory to indicate the use of a secure UI by displaying graphical information on the display of the device by directly writing to the display frame buffer to prevent the display of a "secure icon" by malicious software.

The browser, which may act as a UI for OpenID authentication may be integrity checked and integrated into the trusted world. If the browser is not included in the trusted part, the user may be required to provide consent over a secure UI each time the user OpenID login is used. If the user wants to login to a site using the OpenID identifier, the browser may forward the challenge to the Trusted Ticket Server. The Trusted Ticker Server may switch the UI to the secure UI and present the user with a consent interface which may require the user to interact with the secure UI in order to finish authentication. The Trusted Ticket Server may generate the response and forward it to the OpenID IdP, bypassing the potentially compromised browser. In the TrustedOpenID process, the WTRU's browser and the User Interface may be secured.

A Trusted Visual Token (TVT) may be used. The Trusted Visual Token may include a combination of one or more of the following technical features.

Visual attestation may include the display of some visual information to the user that attests that the user's platform (the device the user interacts with) is in a trustworthy state. Such visual information may include a secret image, e.g., known to the user, but not others, that is present on the platform in an encrypted form, where decryption may be allowed if the platform is in a pre-defined state. This may be referred to as sealing.

Visual attestation may be augmented by additional visualization methods. For instance, data of a specific transaction taking place (e.g., user authentication, payment data, etc.) may be included in the visualization. This may make capture-and-replay attacks harder.

A Privileged Indicator (PI) may be a secure input path (for instance, a key) for the platform, where the endpoint inside the platform is a Trusted Environment or Secure Element, e.g., some execution space which may be trustworthy for the purpose of the desired transaction.

The user may control the visual attestation of the platform by a challenge-response mechanism under his authority. The user may pose at a certain point during an transaction (e.g., authentication, online payment, etc.) process, a challenge to his platform to which the platform may respond with visual attestation This may be implemented using a Privileged Indicator.

The privileged indicator challenge may be used procedurally during a transaction and combined with the transaction such that it may not be circumvented.

The above features may be combined in a platform for use in online transactions as a Trusted Visual Token (TVT). The TVT may be a trustworthy entity on the user's platform, instance.g., realized in a software trusted environment, or in a hardware secure execution environment (such as a smart card), which may respond in a pre-defined manner with visual attestation to the user challenge posed via the PI. A TVT may have one or more of the following features.

TVT visual attestation, proving the TVT's trustworthy state to the user, may be displayed to the user on the platform's main or another, dedicated display.

TVT may use hardware-secured (e.g., smart-card, TPM-sealed, etc.) secrets for visual attestation.

TVT may have access to methods for authenticating the user such as biometric input.

The TVT's trustworthy state may be validated by a remote party, e.g., using remote attestation.

The TVT may validate other components of the platform, for instance a browser or an online banking application, and incorporate information about those components' trustworthiness in visual attestation.

The TVT may have access to data specific to a particular transaction, and be able to incorporate such data in a meaningful and unique way in visual attestation.

Basic modalities of what is displayed by the TVT in visual attestation may include one or more of the following, which may be combined as needed in a specific use case.

A TVT may display a information associated with a user, e.g., a user enrolled secret, personal information, etc. A TVT may display a TVT-specific secret, which may be time dependent. A TVT may display transaction specific data, e.g., a transaction number, transaction amount, currency type, etc. A TVT may display user notifications, e.g., the user may be prompted to authorize a transaction, for example, by using a fingerprint reader, while keeping a privileged indicator pressed.

A basic usage of the TVT in a transaction may be that of user authentication, either locally or to a remote party. This process, which may be referred to as 'log on,' may include one or more of the following features.

Figure 8:
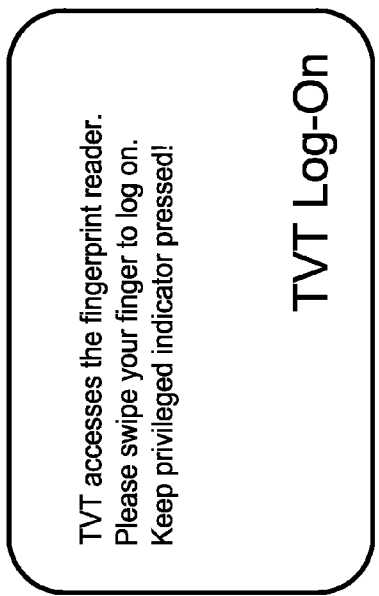

When the user wishes to log on to the platform or a remote service, the user may open a log-on application or browse to a log-on page of the service on the web. The user may press the PI and obtain visual attestation about the log on. FIG. 8 provides an example.

Figure 9:
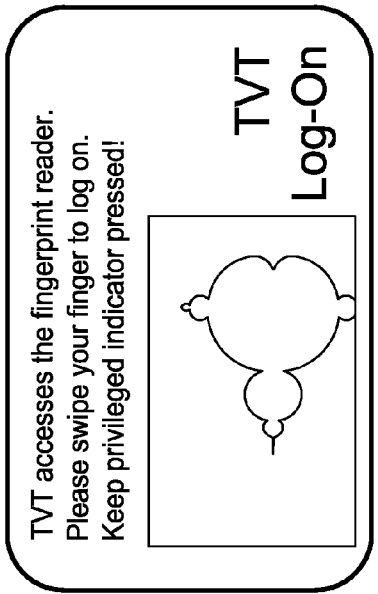

This form of visualization may be augmented by including a secret image that attests to the TVT's state. FIG. 9 provides an example.

Figure 10:
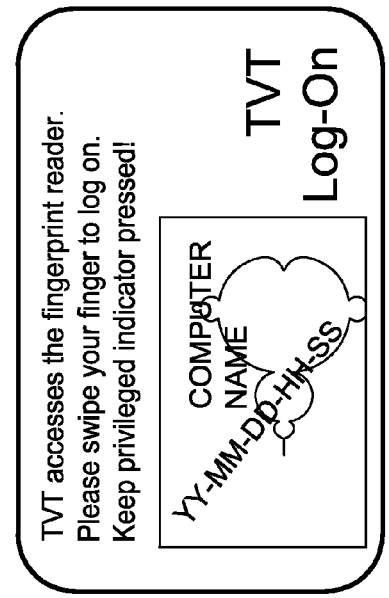

A further security strengthening of TVT visual attestation may be achieved by including additional information, e.g., randomly appearing, hard to delete, fresh, machine dependent, humanly-readable information. FIG. 10 provides an example.

Figure 11:
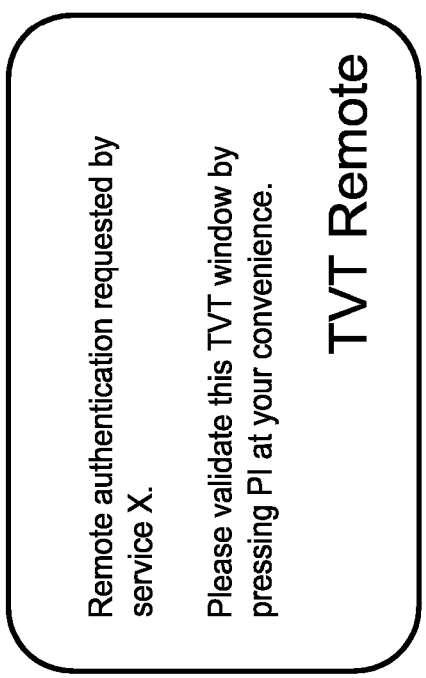
Figure 11:
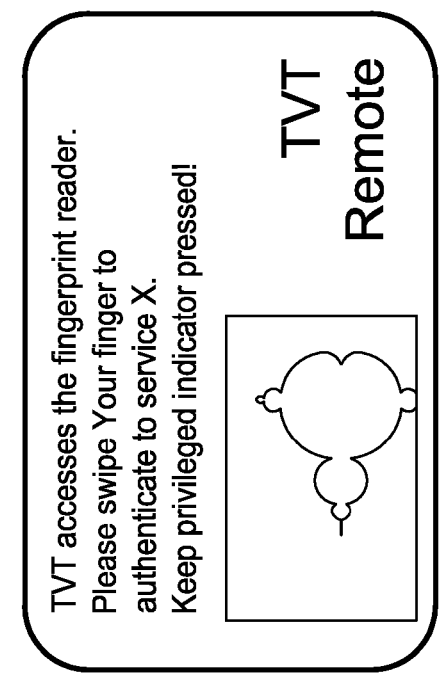

The activity of the TVT for user log-on may be triggered by a remote party, for instance a Web service requesting user authentication. The remote service may signal to the TVT on the platform that it requires user authentication (e.g., via a mutually authenticated channel), upon which the TVT displays a generic log-on notification. For example, the user may press PI and TVT performs visual attestation of itself. The user may authenticate locally, e.g., using biometric input, as in the direct log-on variant described herein. FIG. 11 provides exemplary visual indications.

Figure 12:
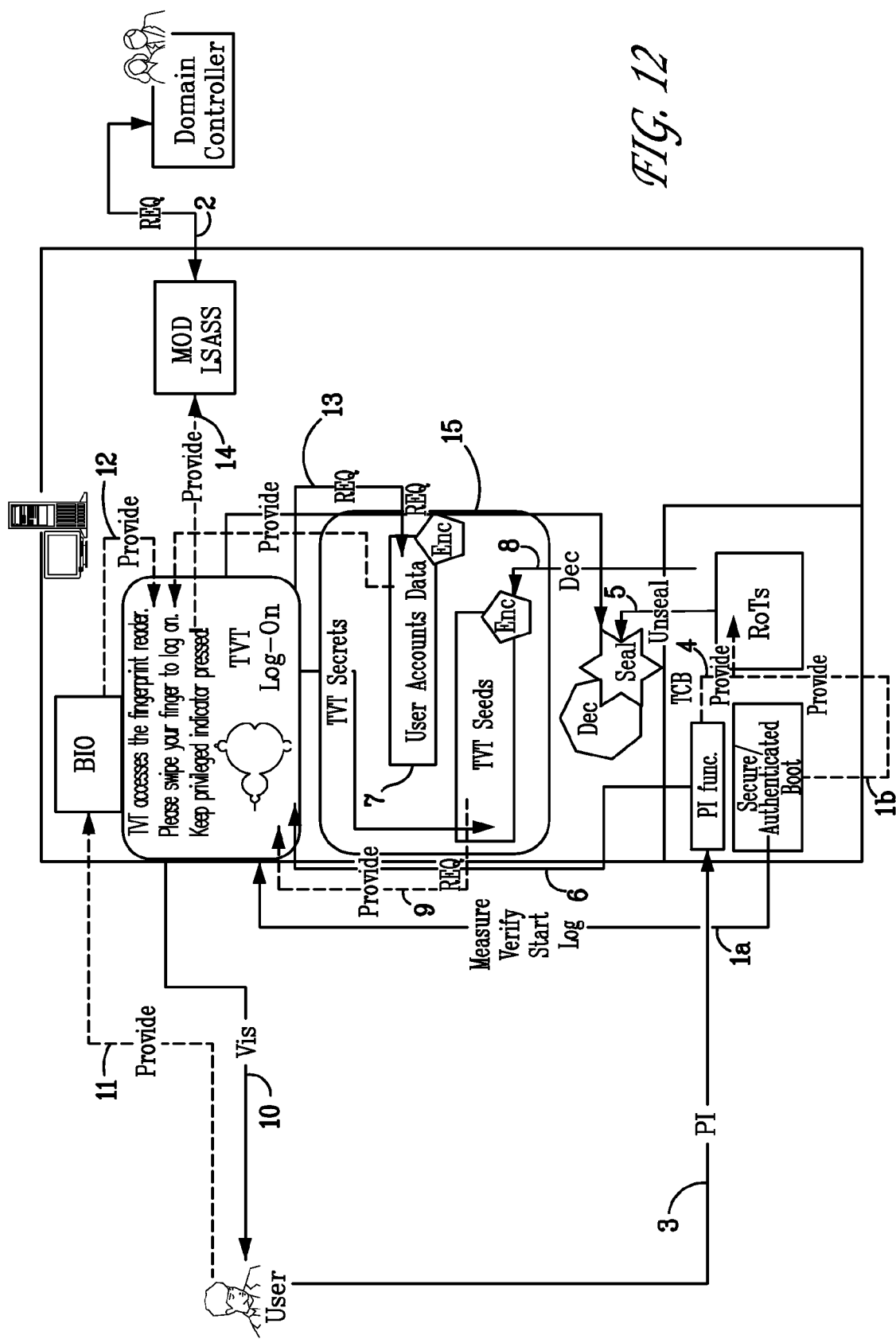
FIG. 12 provides an exemplary implementation of TVT on a platform based on trusted computing concepts.

FIG. 12, as well as the following description, provide an exemplary implementation of TVT on a platform based on trusted computing concepts. The following may include a Microsoft Windows network domain as an example, but is not limited to such implementations.

The following acronyms may be used in FIG. 12 and in the following discussion.

TCB: Trusted Computing Base
BIO: Biometric authentication function
RoT: Root of Trust
MOD LSASS: Modified Local Security Authority Subsystem—A Microsoft Windows component responsible for local and network user log-on
REQ: 'Request'
DEC: Decryption keys for ENC
ENC: keys to encrypt TVT secret data In a secure or authenticated boot process at system start-up, the platform's RoTs may measure and/or store the state of the TVT application (1a), for instance in the platforms' PCRs (Platform Configuration Registers) (1b). The TVT application may be included in a Trusted Environment that includes protection of the TVT at run-time. The measurement facility, as well as the RoTs are included in the TCB of the platform, e.g., in the set of components which are considered to be unconditionally secure during system operation.

When a user wants to log on to a network domain using this platform, the domain controller may request user credentials from the platform (2). TVT activation may occur at this point and the remotely requested TVT user log-on may be initiated as described herein. The user may be notified to use the PI, e.g., see use at (3). The PI signal may be transmitted to some PI functionality included in the TCB.

The PI functionality may unseal the TVT master decryption keys Dec (4) and issue an unsealing request for Dec to the platform RoTs, citing the state of TVT. RoTs may check the state and decrypt the Dec (5), e.g., if the state is correct (unsealing).

Dec keys may refer to keys that are part of a key hierarchy limited to use inside the TCB, for instance keys of a TPM key hierarchy. Dec may be used to decrypt the TVT visual attestation seeds that are encrypted with corresponding encryption keys Enc.

The PI functionality may command the TVT application to visually attest to the user (6). The TVT application may request decryption of the TVT seeds (7), which may be performed using Dec (8), and the TVT seeds may be provided to the TVT application (9). Using them, the TVT application may perform visual attestation (10), including the request for local user authentication, e.g., using biometric input BIO.

The user may authenticate to BIO (11), and the BIO facility may signal authentication success to TVT (12).

TVT may request user credentials from its User Account data storage, e.g., a username and password to be used for network log-on (13). That data may be decrypted and sent to TVT which in turn may provide it to the log-on application LSASS (14), which in turn may forward it to the network domain Controller.

The secrets used by the TVT may include two classes.

TVT seeds may include the secrets that TVT uses to visualize to the user and to communicate securely with remote entities, which may include one or more of the following: seeds for visualization; TVT individual secrets (e.g., specific to a platform); TVT credentials for secure communication with other entities; user defined parameters; per-application secrets; user enrolled secrets, etc.

User Account Data may represent the functions of the TVT that may be similar to a password vault. They comprise, but are not limited to one or more of the following: biometric user reference data; domain, remote service and username lists and associations; user credentials, e.g. passwords or hash values of passwords; credentials for authentication of a remote service or domain controller, etc.

Mutual authentication may take place between the RP and TTS. The OpenID protocol may be defined to include how the RP—user interface may be secured and how the user may be protected from malicious RPs. A malicious RP may impose a threat to the OpenID protocol when the user enters his identity (e.g., OpenID identifier) at the RP into a login field. Although the user may not understand what underlying processes are taking place, the user may be redirected to the IdP page where his identity may be managed for the sites he visits using OpenID. At the IdP the user may enter his credentials (e.g., password) and may be redirected. However, when the user visits another page which is also OpenID enabled, the IdP may not ask for the password again and may use the stored cookie instead. A malicious site RP may be able to redirect the user to a convincing looking IdP which may be a fake site aimed at stealing the users credential (password). The fake IdP may then log the user into OpenID with the real IdP and the user may not experience anomalies. The attack impact may be increased by the fact that an IdP may act as a SSO point for the sites the user logged into using OpenID, hence the attacker may steal many accounts from the user. A single malicious RP website may be used to trick the user into visiting a password collecting fake IdP page.

RP authentication may take place using the TTS. The password phishing attack may be mitigated by using one or more of the following.

Microsoft Information Cards may be used as credentials, e.g., so users may not have to enter passwords, which may be stolen. Information Cards is a Microsoft technology which may show the user several 'cards' to choose from on the screen. The user may select a card to authenticate to the service. Information Cards may use cryptographic proofs to provide a proof of possession for the identity. These proofs may not be reusable and may not be replayed, and hence, capturing by a password harvesting site may not yield access to the OpenID identity.

Each RP may be authenticated at the user's side. Such an authentication may be performed in a secure way that does not interfere with the SSO experience the user is expecting from OpenID. In TOpenID, the TTS may be the entity to verify given credentials from the RP. When using HTTPS connections to the RP, the TTS may act as a proxy for the browser and intercept the call from the browser to the OpenID enabled site. Such an interception mechanism may recognize the login form in the page being sent from the RP to the browser after an HTTP GET request. The TTS may then request the domain certificate and check its validity. If the certificate is valid, the user may at least be assured that the site he visits uses an encrypted connection. Additional features of secure socket layer (SSL) certificates, such as asserted identities may be established and checked by the TTS. An asserted identity may be that a TTP maintains a database of well-known pages or a blacklist of known phishing, malware etc. sites and provides the TTS with a revocation list of all certificates known to be used by such sites.

The TTS may be have the capability to be expanded in a modular approach. For example, there may be a module that evaluates the Google Pagerank, the Web Of Trust Score, another module which takes into account reputation systems and so on. These modules may provide scores to the TTS which in turn may be able to, e.g., by the use of user defined weighting policies, calculate a summarized score of the module inputs and present the user with an assessment of the site. Such a feature may go beyond existing questions, for example in Firefox or Internet Explorer where users are asked to check the certificate in case of a mismatch or a missing trust relationship to the issuing CA. These modules may also be used for non HTTPS connections to a RP, where SSL certificates may not available. In general the modules may run in a secure environment, for example the same secure environment as used by the TTS, and they may be able to communicate securely with the TTS.

It may be possible to maintain a small reference database of hash values of existing pages. The enrolment process may have to be defined for new pages, but assuming that a set of reference metrics exists for web pages/servers, the TTS may make use of these to verify the integrity and authenticity of the visited RP. Following the remote attestation protocol, similar to the TTS and the OpenID IdP protocols, the RP may attest its integrity to the TTS which then may allow to proceed further in the case of a successful attestation.

An exemplary mutual authentication between the TTS and the RP may include one or more of the following. A mutual authentication may go beyond the checking of the identity and trustworthiness of the RP website and server. The process may involve a checking of the integrity and authenticity of the TTS running on the device by the RP. This may be useful for corporate or government enrollments of TOpenID, where RPs may be assured that the user is indeed using TOpenID as authentication mechanism. The RP may want to be assured that a certain type of authentication mechanism, for example TOpenID, is used between IdP and the user TTS. However, the RP may still have to trust that the IdP actually uses the TTS. Otherwise, the user may claim to use TOpenID while he authenticates using another mechanism to his OpenID IdP.

Such an authentication may involve several modifications to the protocol. The RP may (e.g., after verifying the authenticity and possibly integrity of the TTS on the user's device) send a kind of nonce to the TTS. This nonce may be unique and act as an identifier for this request from this particular client TTS. The TTS may store this nonce securely in protected storage, associated with the login request. After the RP redirects the user to the IdP, the IdP may perform the authentication protocol as in TOpenID. The TTS may release the nonce (e.g., the release may be restricted to use in a TOpenID protocol) to a prior authenticated OP. The assertion coming from the IdP to the RP may need to include the nonce, which may assure the RP that TOpenID was indeed used for authentication.

The term nonce used in this scenario may be used to describe a token passed by the RP to the TTS to verify that TOpenID authentication may be used with the IdP.

To define the security properties of the nonce, one may consider different attack types. The user may attempt to inject the nonce in a communication after having performed a non-TOpenID authentication. This may require the user to intercept the communication between IdP and RP which may be assumed as being difficult although not impossible. The user may also extract the nonce from the TTS or the initial communication from TTS with the RP. This may be difficult if the nonce is stored in secured storage, and if the TTS is not compromised. It may be assumed that a compromised TTS may not receive such a nonce from the RP, as the RP first may verify the TTS integrity and then send the nonce. Such a security-aware RP may be equipped with integrity metrics of TTS instances running on the user's devices. If the TTS instances that are receiving nonces from RPs are secured, then it may be assumed that these TTSs securely protect the nonce from malicious users.

Another attack model may involve a malicious IdP, which may attempt to fake the authentication mechanism and therefore may retrieve the nonce from the TTS. In such a scenario it may be assumed that the TTS secures the nonce efficiently. A more complicated attack model may involve a colluding IdP and user. If the user is able to attain the nonce he may forward it to the IdP without performing TOpenID authentication. The IdP may then use the nonce in the message to the RP claiming that the user authenticated using TOpenID.

In the considered attack models it may be seen that security may rely on the fact that the TTS may receive the nonce if it is integrity checked by the RP and that such a TTS may protect the nonce sufficiently and be limited to releasing it in a TOpenID authentication protocol. As the nonce may be unique for each service access, a malicious IdP may not replay it to the RP.

The protocol may include an attestation mechanism. The OpenID provider may challenge the user to provide information about the system state. If the system is in a trustworthy state, access may be granted. This may leverage security for web-applications, as access to the service may be limited to 'trustworthy' systems.

Instead of having a service application on the user side listening for incoming OpenID authentication requests and forwarding them to the TPM, a seamless browser integration may be provided. This may be achieved by using a browser extension that takes this functionality. The OpenID provider may issue the challenge inside the HTML code of the sign-in page. A browser extension may read this information and forward the necessary data to the TPM. The TPM in turn may create the signed ticket and return it to the browser extension. The extension may then issue the correct HTTPS response to the OpenID provider including the signed ticket.

The browser may be implemented on a UICC within a device, if the device has a UICC. Implementing the browser on a UICC may give the device an inherent secure environment for the browser to operate from. The interface between the browser within the UICC and the rest of the device (including the TPM) may also be secured using a GBA-based secure channel.

The OMTP BONDI framework is a suite of APIs that may allow widgets or web-applications to access device capabilities via javascript in HTML pages. BONDI may be extensible by additional APIs to allow access to further device capabilities. The BONDI security framework may be restricted to provide a device capability access control mechanism such that it may enforce access to specific underlying device capabilities independently of the JavaScript APIs trying to access them. BONDI may not shield device capabilities. BONDI may not be the exclusive access provider to device resources and capabilities. If other frameworks or functions exist in addition to BONDI, these Non-BONDI proprietary JavaScript APIs or Plugins outside of a BONDI framework may not be controlled or managed and they may undermine the BONDI security framework.

Figure 13:
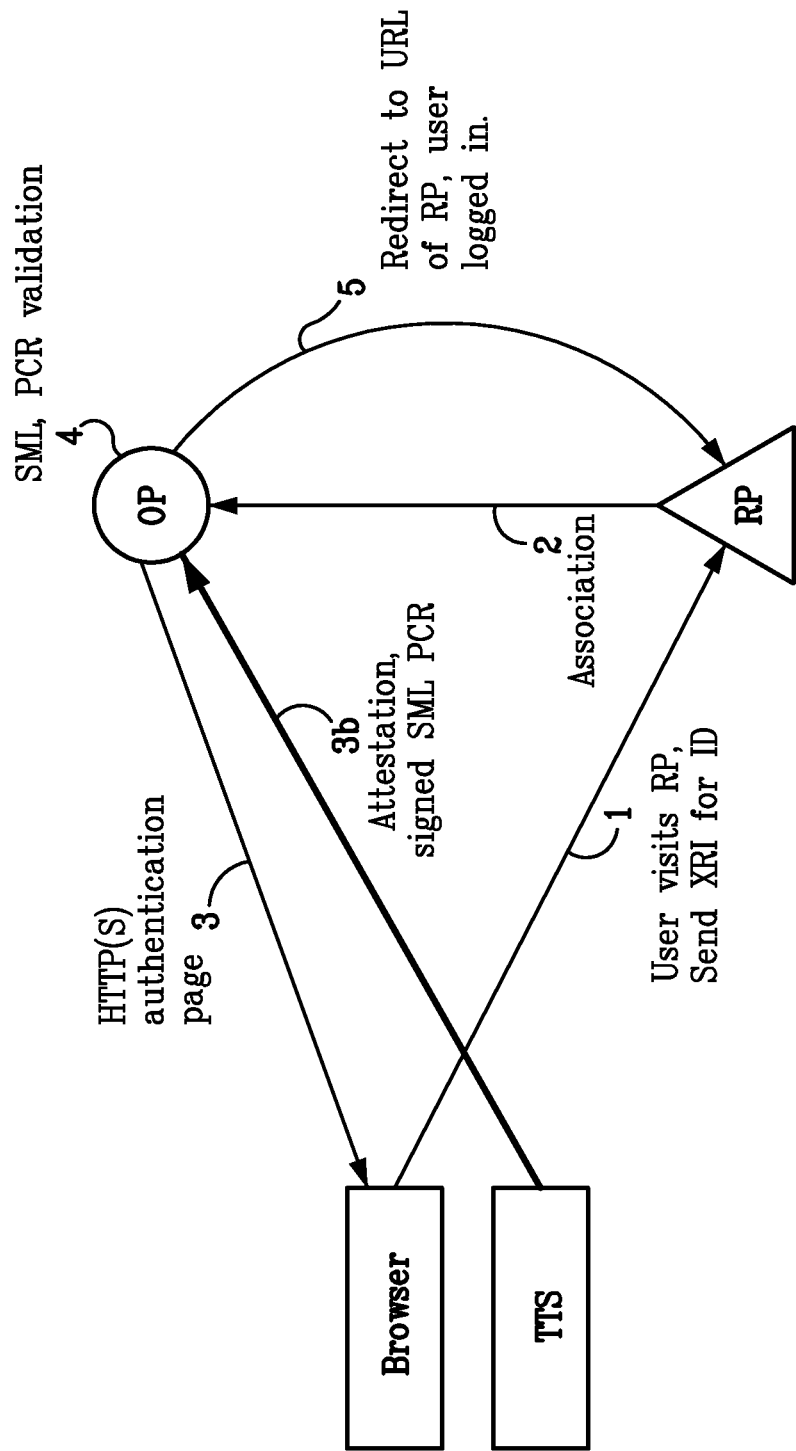
FIG. 13 illustrates an exemplary use of BONDI with TOpenID.

FIG. 13 is a diagram of an exemplary use of BONDI with TOpenID. At 1, a user may visit an RP and send XRI for ID. At 2, an association may be created between the RP and OP. At 3, the OP may present an HTTP(S) authentication page. At 3b, the trusted ticket server may provide a signed SML PCR for attestation. At 4, the OP may validate the SML PCR. At 5, the OP may redirect to a URL of the RP with the user logged in.

If BONDI is executed on top of a trusted execution environment, e.g., such that the policy management and enforcement may be stored securely, and, the access provider to device capabilities is limited to the BONDI framework, it may be possible to build web applications which securely access device capabilities. Such functions may include direct access from the webpage to secured functions in the device. Executing a trusted BONDI and adding a special API that allows webpages to access the Trusted Ticketserver service running on the device may open a new way for seamless integration of TOpenID into the browser.

Figure 14:
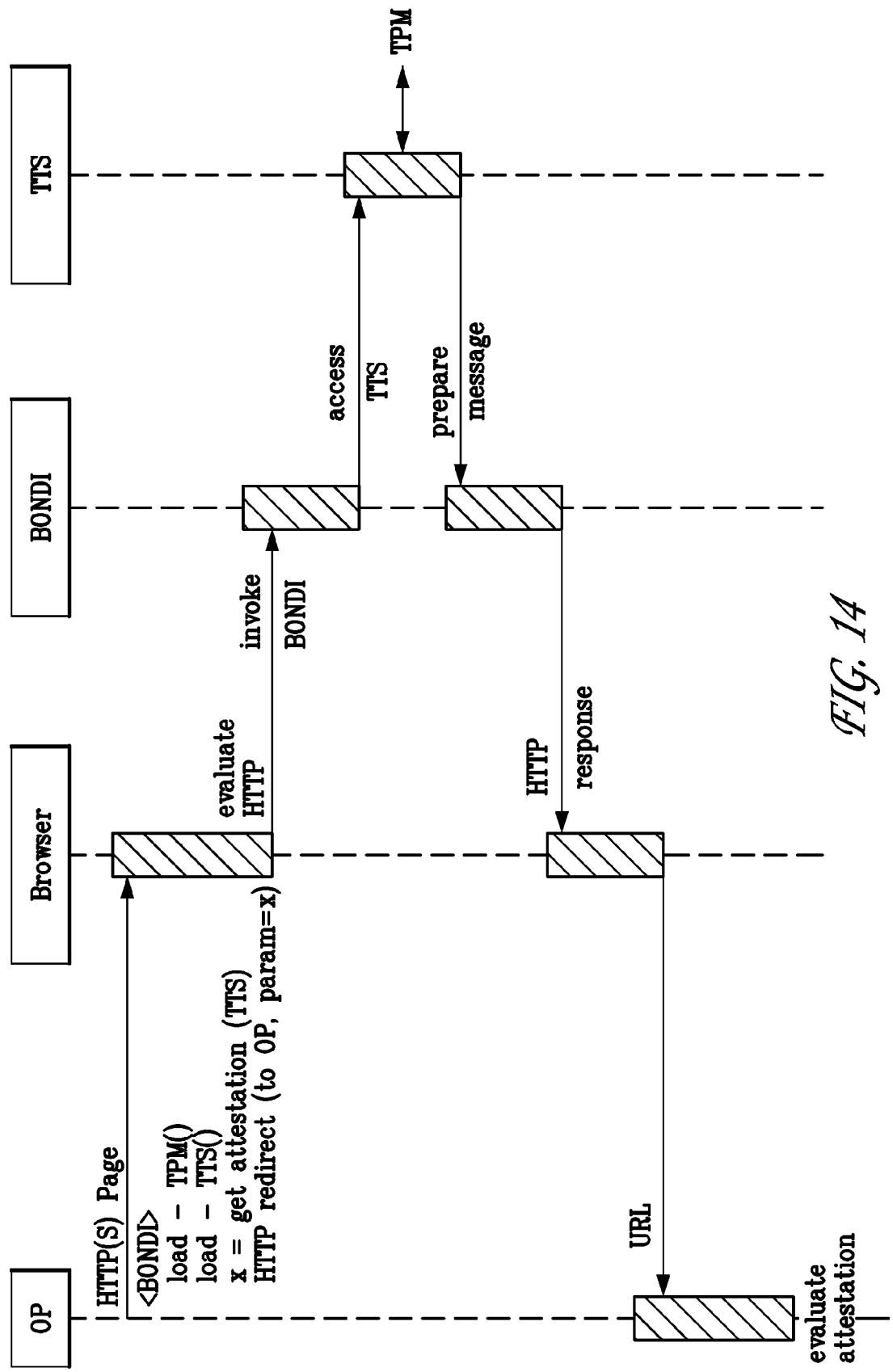
FIG. 14 illustrates an exemplary call flow diagram for use of BONDI with TOpenID.

FIG. 14 illustrates an exemplary call flow diagram for use of BONDI with TOpenID. The OpenID OP may include a BONDI javascript command in the authentication page for TOpenID enabled accounts. This javascript inside the page may be executed by the client's browser and may first load the BONDI libraries and APIs. The javascript may query the Trusted TicketServer from the HTML page. The query may include the ID, REQ and the nonce from the OpenID OP. Through the BONDI API the query may be forwarded to the Ticket Server on the device. A BONDI security policy may be used to restrict access to the Trusted TicketServer, e.g., to a single OpenID OP. A request may be made to the user for permission or to require user consent for each access attempt to the Trusted TicketServer. The Trusted Ticketserver may retrieve the signed PCR quote Q and the measurement log ML and using a HTTP POST message transfer the values of these to the OpenID OP. The OP may then evaluate the received data and proceed with the protocol as in the basic TOpenID case. An advantage of such an integration may be that less user interaction may be required and the OP may communicate directly with the Trusted Ticketserver over the HTTP protocol without having to initiate a second communication channel for the transport of the ticket, for example the quote and ML.

Figure 15:
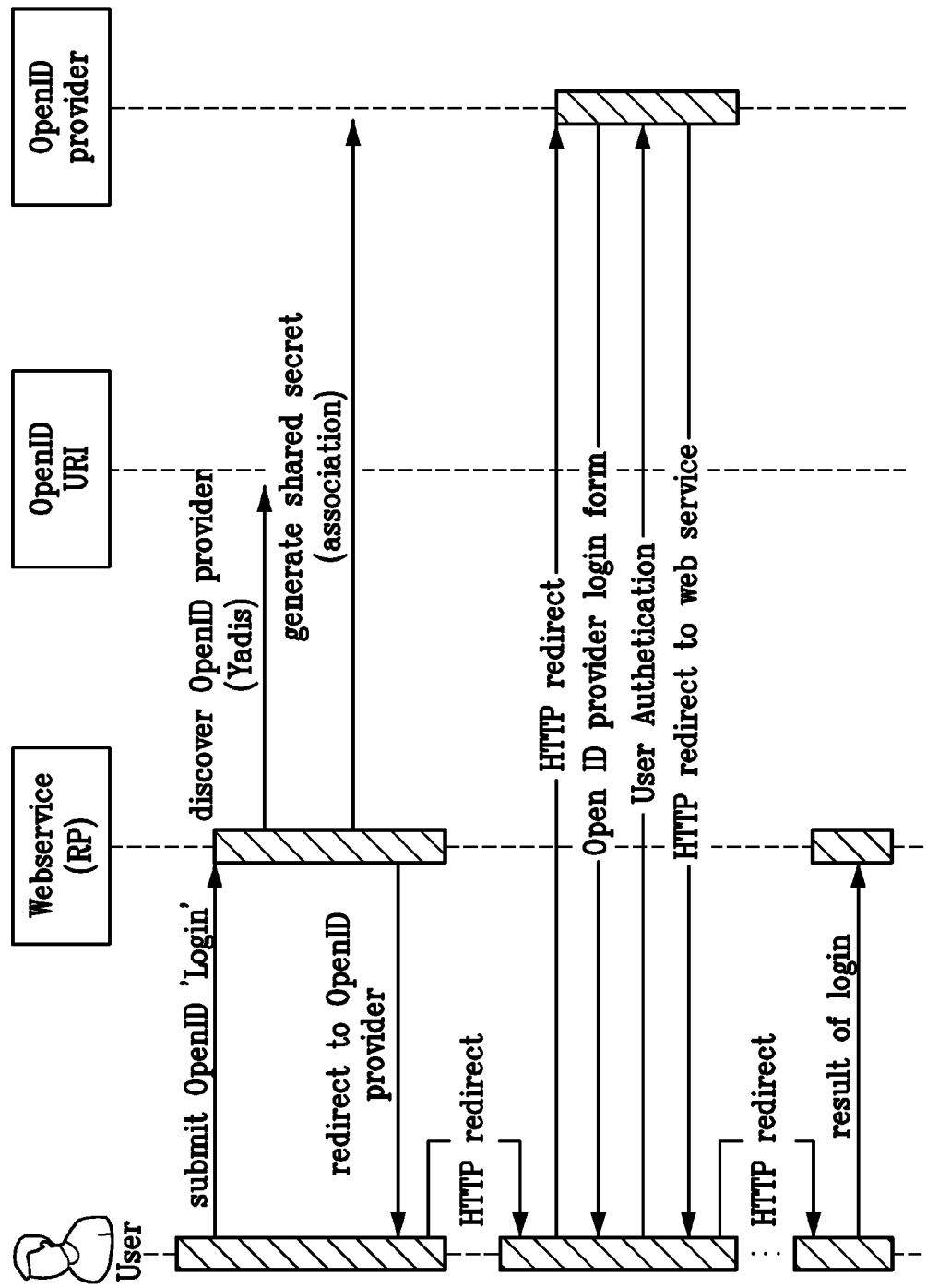
FIG. 15 is a diagram of an exemplary OpenID protocol.

FIG. 15 is a diagram of an exemplary OpenID protocol.

Figure 16:
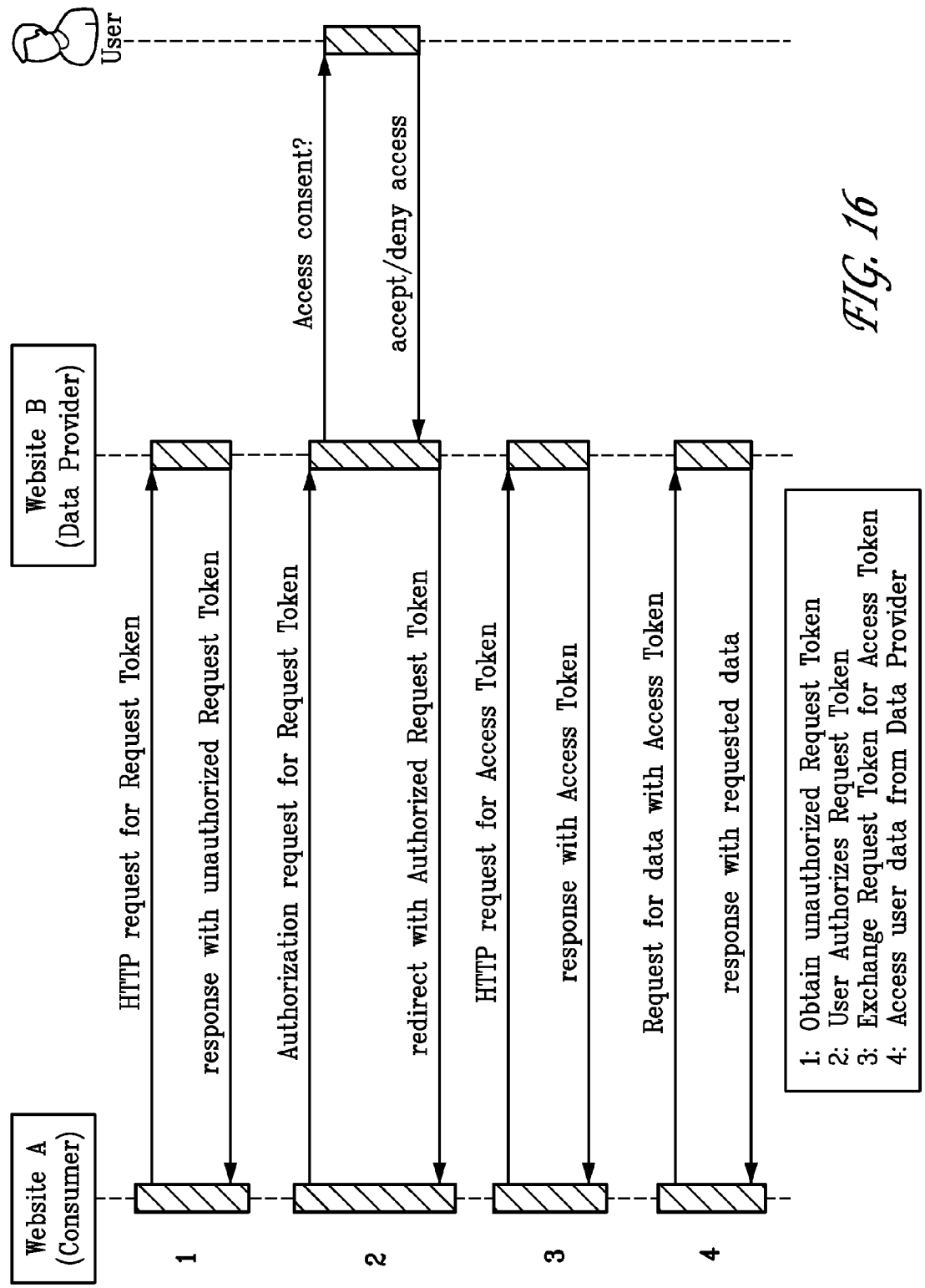
FIG. 16 is a diagram of an exemplary OAuth protocol.

FIG. 16 is a diagram of an exemplary OAuth protocol.

Figure 17:
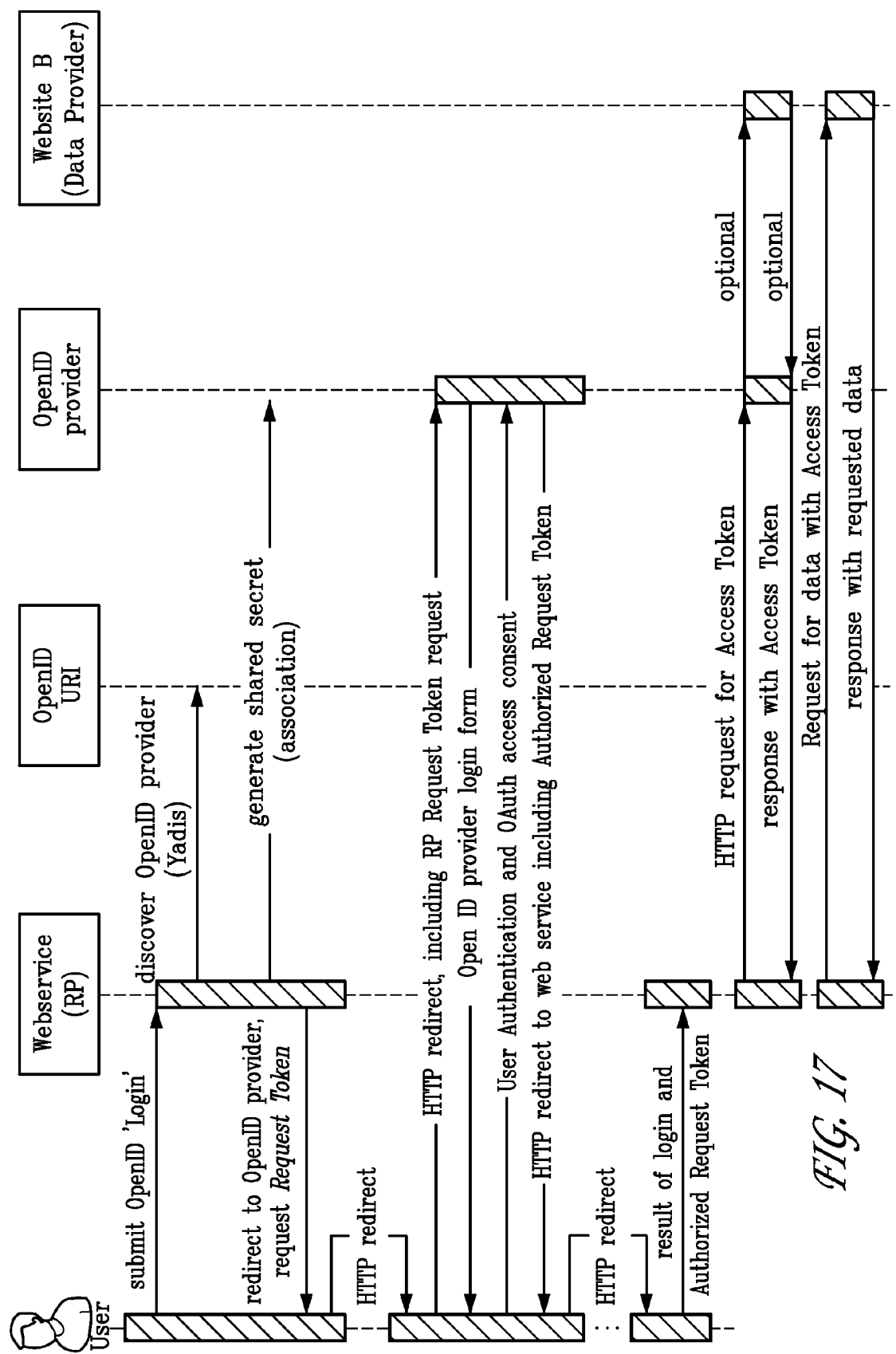
FIG. 17 is a diagram of an exemplary combined OpenID/OAuth protocol.

FIG. 17 is a diagram of an exemplary combined OpenID/OAuth protocol.

Figure 18:
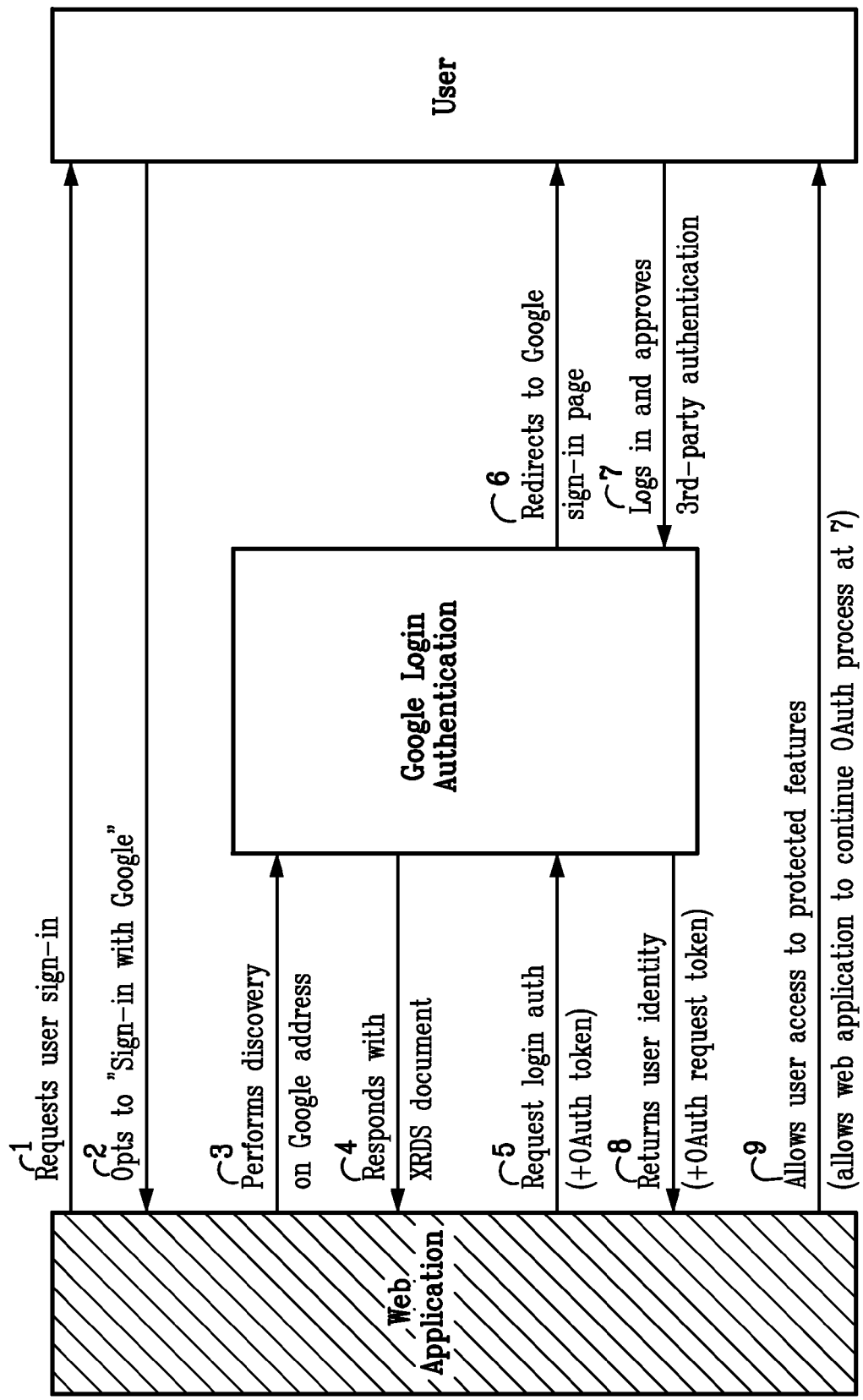
FIG. 18 is a diagram of an exemplary OpenID protocol with a Google OpenID.

FIG. 18 is a diagram of an exemplary OpenID protocol with a Google OpenID.

Figure 19:
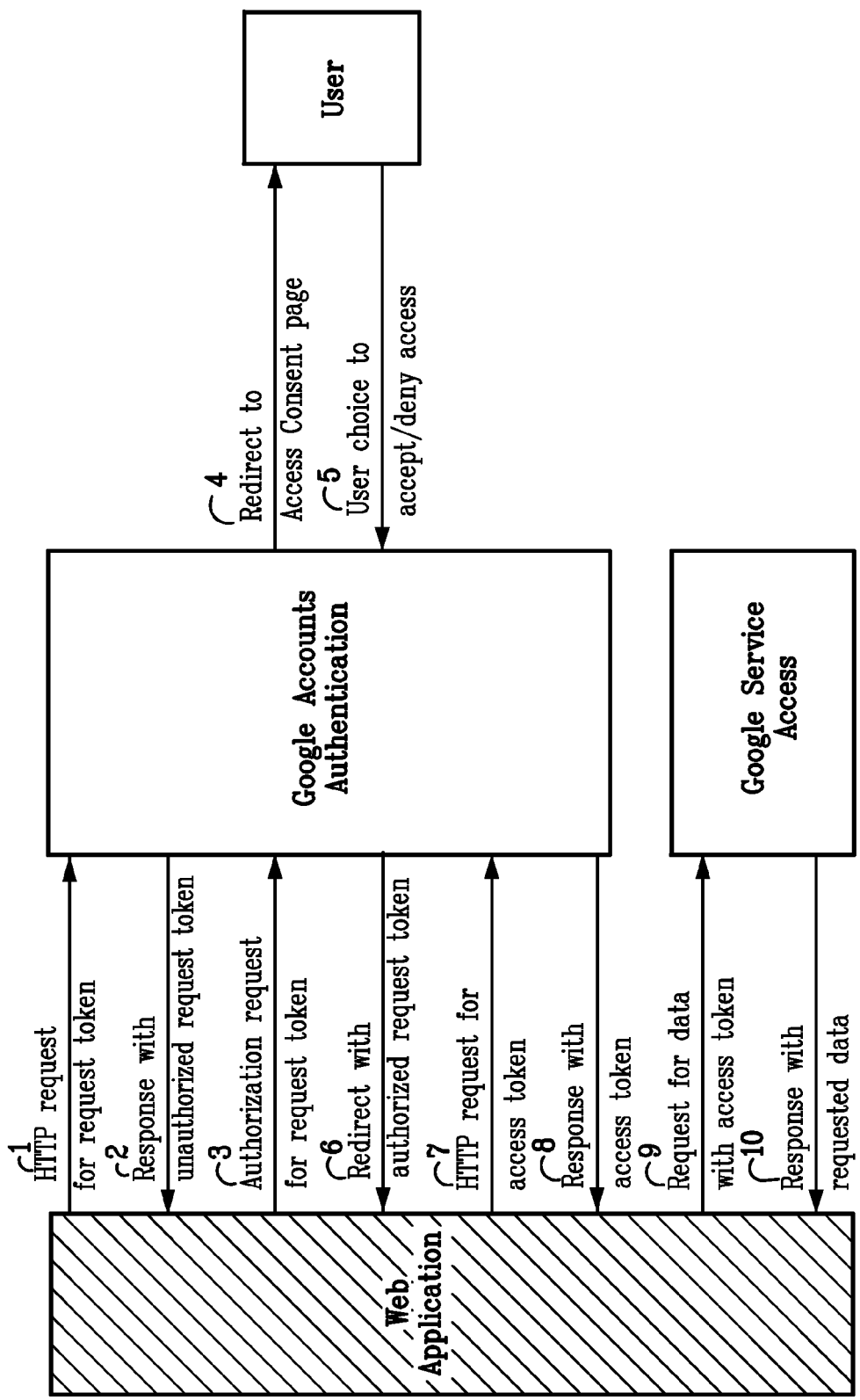
FIG. 19 is a diagram of an exemplary OAuth protocol using a Google API.

FIG. 19 is a diagram of an exemplary OAuth protocol using a Google API.

Figure 20:
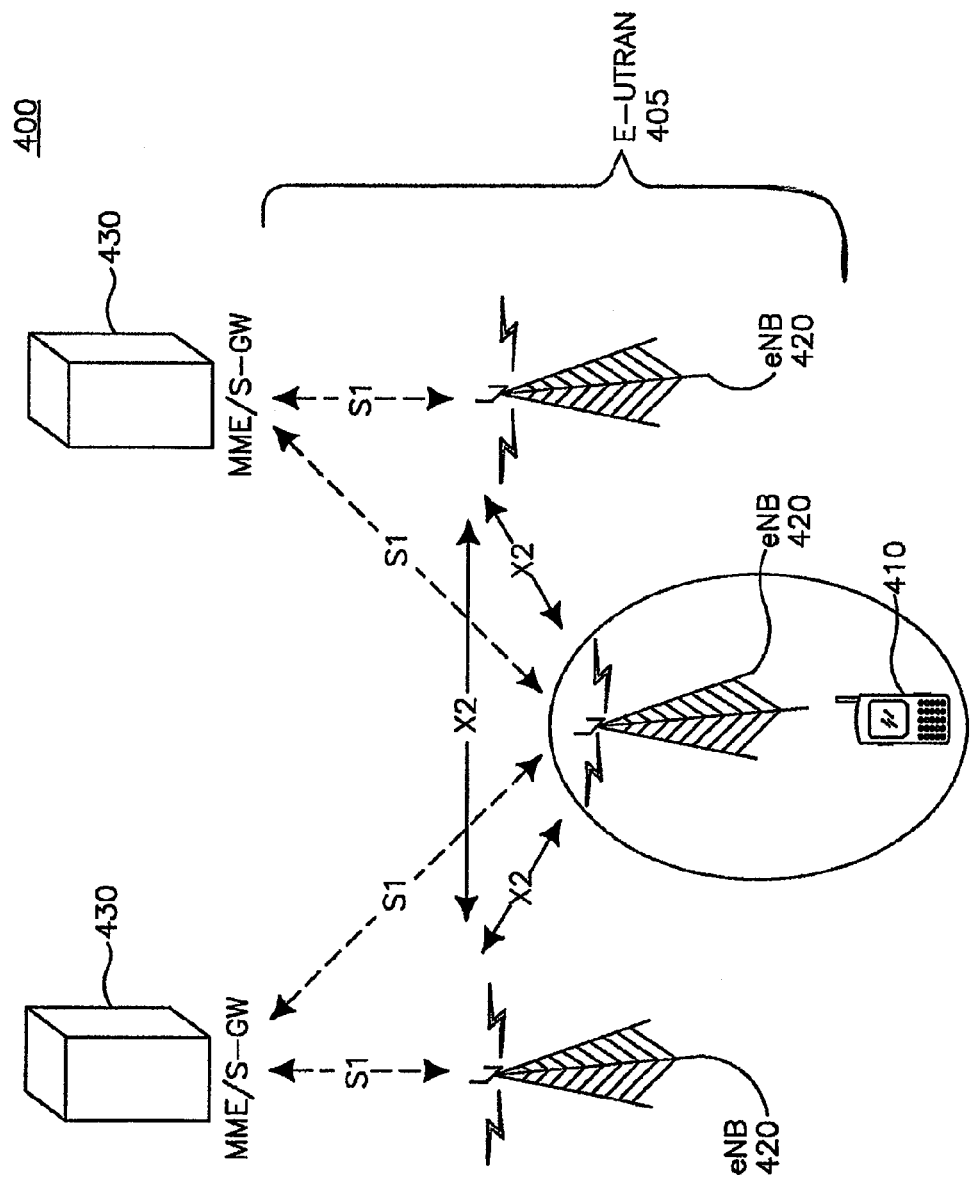
FIG. 20 illustrates an exemplary Long Term Evolution (LTE) wireless communication system/access network.

As disclosed herein, the user client/platform may be a WTRU or base station that may be used in, for example, in a wireless communication system. In one example, but also applicable to other wireless communication systems, FIG. 20 shows an exemplary Long Term Evolution (LTE) wireless communication system/access network 400 that includes an Evolved-Universal Terrestrial Radio Access Network (E-UTRAN) 405. The E-UTRAN 405 includes several evolved Node-Bs, (eNBs) 420. The WTRU 410 is in communication with an eNB 420. The eNBs 420 interface with each other using an X2 interface. Each of the eNBs 420 interface with a Mobility Management Entity (MME)/Serving Gateway (S-GW) 430 through an S1 interface. Although a single WTRU 410 and three eNBs 420 are shown in FIG. 20, it should be apparent that any combination of wireless and wired devices may be included in the wireless communication system access network 400.

Figure 21:
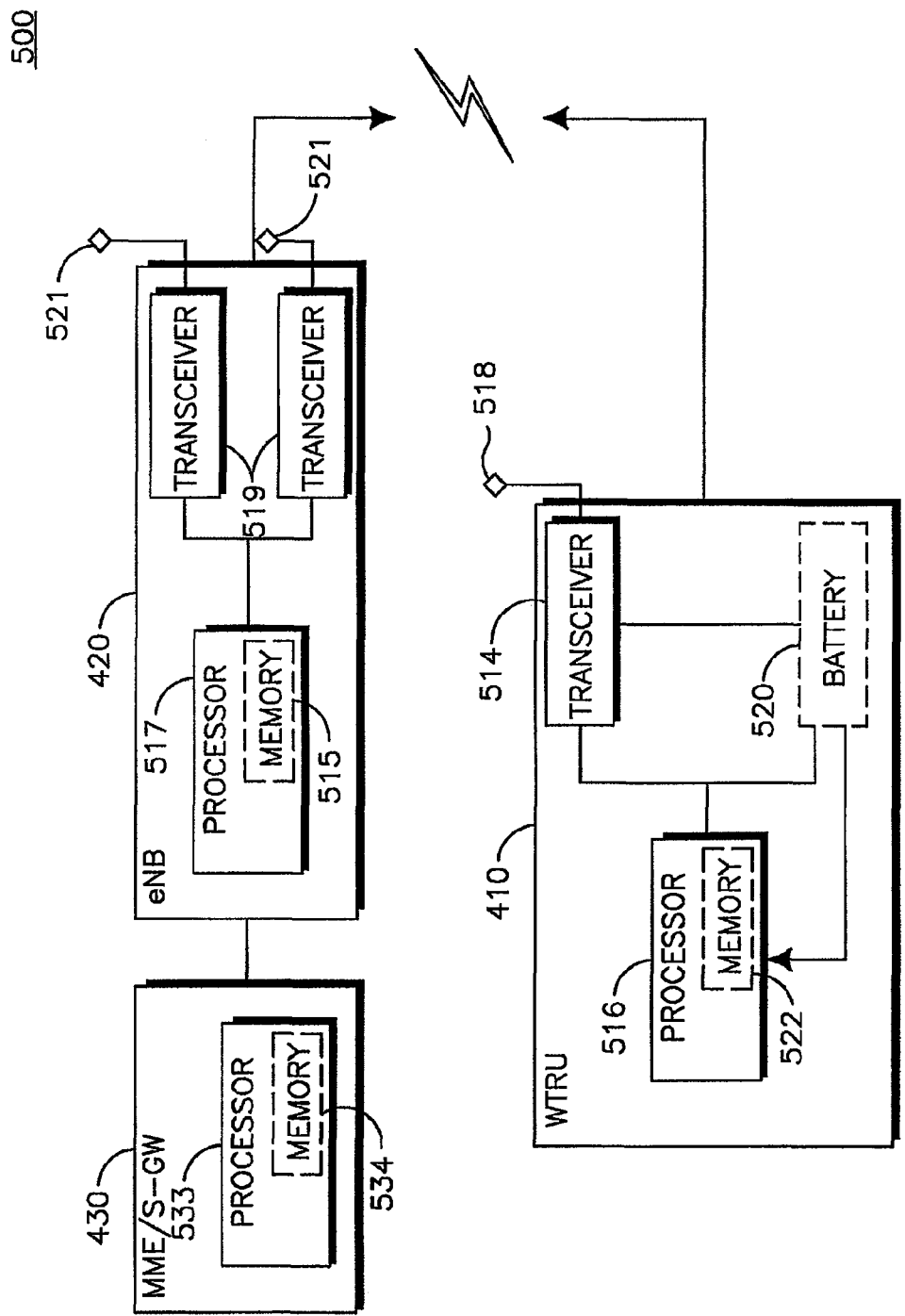
FIG. 21 illustrates an exemplary LTE wireless communication system.

FIG. 21 is an exemplary block diagram of an LTE wireless communication system 500 including the WTRU 410, the eNB 420, and the MME/SGW 430. As shown in FIG. 21, the WTRU 410, the eNB 420 and the MME/S-GW 430 are configured to perform a method of blind decoding (BD) complexity reduction using linkage.

In addition to the components that may be found in a typical WTRU, the WTRU 410 includes a processor 516 with an optional linked memory 522, at least one transceiver 514, an optional battery 520, and an antenna 518. The processor 516 may be configured to perform a method disclosed herein. The transceiver 514 is in Communication with the processor 516 and the antenna 518 to facilitate the transmission and reception of wireless communications. In case a battery 520 is used in the WTRU 410, it powers the transceiver 514 and the processor 516.

In addition to the components that may be found in a typical eNB, the eNB 420 includes a processor 517 with an optional linked memory 515, transceivers 519, and antennas 521. The processor 517 may be configured to perform a method disclosed herein. The transceivers 519 are in communication with the processor 517 and antennas 521 to facilitate the transmission and reception of wireless communications. The eNB 420 is connected to the Mobility Management Entity/Serving Gateway (MME/S-GW) 430 which includes a processor 533 with an optional linked memory 534.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed:

1. A method performed at a wireless device having a user, the method comprising:
  receiving, by the wireless device, an authentication request from a network application function, the authentication request comprising an OpenID identity that corresponds to the user;
  when the authentication request is accepted, retrieving, by a trusted ticket server residing on the wireless device, authentication data and platform validation data using a storage root key, wherein the platform validation data includes a measure of trustworthiness of the wireless device and a measure of trustworthiness of the trusted ticket server, and the authentication data is associated with the OpenID identity that corresponds to the user;
  sending the platform validation data and the authentication data associated with the OpenID identity that corresponds to the user to the network application function; and
  receiving verification data indicating that the network application function has verified the platform validation data and the OpenID identity that corresponds to the user.

2. The method of claim 1, wherein the verification data indicates that a system state indicated by the platform validation data matches a previously generated reference value.

3. The method of claim 1, wherein the platform validation data is signed.

4. The method of claim 1, wherein the platform validation data includes a user identification parameter.

5. The method of claim 1, wherein the platform validation data includes attestation data.

6. The method of claim 5, wherein the attestation data includes an SML and a PCR quote signed with an AIK.

7. The method of claim 1, further comprising receiving a ticket comprising the verification data, wherein the ticket is capable of being reused to perform a subsequent authorization without revalidation of the wireless device.

8. The method of claim 7, wherein the ticket includes a timestamp.

9. The method of claim 7, wherein the ticket includes an origination timestamp.

10. The method of claim 7, wherein the ticket includes a lifetime limit.

11. The method of claim 7, wherein the ticket includes an end date.

12. The method of claim 7, wherein the ticket includes a usage parameter limit.

13. The method of claim 7, further comprising receiving a ticket reference from a network entity.

14. The method of claim 13, wherein the ticket reference is capable of being used to obtain the ticket from the network application function, and wherein the verification data is capable of being reused to perform a subsequent authorization without revalidation of the wireless device.

15. The method of claim 1, further comprising:
  establishing a connection to a relying party;
  receiving a browser redirection to the network application function; and
  sending an authentication request to the network application function.

16. The method of claim 1, wherein the verification data indicates access granted to a relying party.

* * * * *